US009827822B2

(12) United States Patent
Tanahashi et al.

(10) Patent No.: US 9,827,822 B2
(45) Date of Patent: Nov. 28, 2017

(54) DAMPING FORCE GENERATION DEVICE FOR VEHICLE

(71) Applicant: TOYOTA JIDOSHA KABUSHIKI KAISHA, Toyota-shi, Aichi (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/003,933

(22) Filed: Jan. 22, 2016

(65) Prior Publication Data
US 2016/0214453 A1 Jul. 28, 2016

(30) Foreign Application Priority Data

Jan. 23, 2015 (JP) .................................. 2015-011585
Jul. 3, 2015 (JP) .................................. 2015-134644

(51) Int. Cl.
*F16F 9/46* (2006.01)
*B60G 13/08* (2006.01)
(Continued)

(52) U.S. Cl.
CPC ............. *B60G 13/08* (2013.01); *B60R 16/06* (2013.01); *F16F 9/3207* (2013.01); *F16F 9/38* (2013.01);
(Continued)

(58) Field of Classification Search
CPC ............... B60G 13/08; B60G 2202/24; B60G 2206/41; F16F 9/3207; B60R 16/06
(Continued)

(56) References Cited

U.S. PATENT DOCUMENTS 3,597,668 A  8/1971  Yoshimine
3,922,214 A  11/1975  Van Cakenberghe
(Continued)

FOREIGN PATENT DOCUMENTS

CN  101801695 A  8/2010
JP  S50-26778 A  3/1975
(Continued)

OTHER PUBLICATIONS

Office Action issued in U.S. Appl. No. 15/018,085 dated Dec. 14, 2016.
(Continued)

*Primary Examiner* — Christopher Schwartz
(74) *Attorney, Agent, or Firm* — Andrews Kurth Kenyon LLP

(57) ABSTRACT

A damping force generation device for a vehicle includes a shock absorber including a cylinder and a piston. The shock absorber is coupled to a vehicle body, a wheel carrier, and the like at a rod part of the piston and the cylinder, respectively, and is configured to generate a damping force due to a flow resistance when oil passes through an orifice formed in the piston. Each of self-discharge type charge eliminators is fixed to a surface of a specific member being at least one of a component of the shock absorber or an auxiliary member connected to the component. The charge eliminator reduces positive electric charge that is charged to the specific member, to thereby reduce a charge amount of the oil.

7 Claims, 12 Drawing Sheets

(51) Int. Cl.
   *F16F 9/32* (2006.01)
   *B60R 16/06* (2006.01)
   *F16F 9/38* (2006.01)
   *H05F 3/06* (2006.01)

(52) U.S. Cl.
   CPC ............ *H05F 3/06* (2013.01); *B60G 2202/24* (2013.01); *B60G 2206/41* (2013.01); *F16F 2230/10* (2013.01)

(58) Field of Classification Search
   USPC .................. 188/266, 267.1, 276, 315, 322.13
   See application file for complete search history.

(56) References Cited

U.S. PATENT DOCUMENTS

| | | | |
|---|---|---|---|
| 4,795,935 A | 1/1989 | Fujii et al. | |
| 5,095,400 A | 3/1992 | Saito | |
| 5,382,359 A | 1/1995 | Brandt | |
| 5,586,627 A * | 12/1996 | Nezu | B60G 17/08 188/266.6 |
| 5,788,030 A * | 8/1998 | Rottenberger | F16F 9/34 188/290 |
| 6,235,385 B1 | 5/2001 | Lee | |
| 7,248,454 B2 | 7/2007 | Takayanagi | |
| 7,684,169 B1 | 3/2010 | Larkin | |
| 7,832,528 B1 | 11/2010 | Liang | |
| 7,971,689 B2 | 7/2011 | Moore | |
| 8,503,154 B2 | 8/2013 | Nakai | |
| 9,044,916 B2 | 6/2015 | Koike et al. | |
| 2002/0179311 A1 | 12/2002 | Alper | |
| 2003/0183465 A1 | 10/2003 | Ikeda | |
| 2007/0227843 A1 | 10/2007 | Park | |
| 2008/0036241 A1 | 2/2008 | Aisenbrey | |
| 2010/0200343 A1 | 8/2010 | Kondo et al. | |
| 2012/0039012 A1 | 2/2012 | Nakai | |
| 2014/0324289 A1 | 10/2014 | Uchino et al. | |
| 2016/0059838 A1 | 3/2016 | Yamada et al. | |
| 2016/0108868 A1 | 4/2016 | Tanahashi et al. | |
| 2016/0177811 A1 | 6/2016 | Tanahashi et al. | |
| 2016/0186639 A1 | 6/2016 | Tanahashi | |
| 2016/0186703 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi | |
| 2016/0223024 A1 | 8/2016 | Tanahashi et al. | |
| 2016/0230824 A1 | 8/2016 | Tanahashi et al. | |
| 2016/0280162 A1 | 9/2016 | Yamada et al. | |

FOREIGN PATENT DOCUMENTS

| | | |
|---|---|---|
| JP | H05-238438 A | 9/1993 |
| JP | H06-003396 A | 1/1994 |
| JP | 06-027372 U | 4/1994 |
| JP | H10-213223 A | 8/1998 |
| JP | H11-30265 A | 2/1999 |
| JP | 2001-355524 A | 12/2001 |
| JP | 2002-104106 A | 4/2002 |
| JP | 2006-234093 A | 9/2006 |
| JP | 2007-225111 A | 9/2007 |
| JP | 2008-181694 A | 8/2008 |
| JP | 2009-181694 A | 8/2009 |
| JP | 2010-192177 A | 9/2010 |
| JP | U3191490 U | 6/2014 |
| JP | 2014-218244 A | 11/2014 |
| WO | 2015064195 A1 | 5/2015 |

OTHER PUBLICATIONS

U.S. Patent and Trademark Office, Final Office Action in U.S. Appl. No. 15/018,085 dated Jun. 7, 2017, 26 pages.

* cited by examiner

DAMPING FORCE GENERATION DEVICE FOR VEHICLE

CROSS-REFERENCE TO RELATED APPLICATIONS

The present application claims priority to Japanese Patent Application Nos. 2015-011585 and 2015-134644 filed on Jan. 23, 2015 and Jul. 3, 2015, respectively, both of which are incorporated herein by reference in their entireties.

BACKGROUND OF THE INVENTION

1. Field of the Invention

The present invention relates to a damping force generation device for a vehicle, and more particularly, to a damping force generation device including a shock absorber.

2. Description of the Related Art

When a vehicle such as an automobile travels, static electricity is generated in the vehicle due to the flow of air in a state in which the air is brought into friction contact with the vehicle. Static electricity is also generated when each portion of a tire is repeatedly brought into contact with a road surface and separated therefrom along with the rotation of a wheel, when components in an engine, a brake device, or the like move relatively under a contact state, and the like.

The vehicle is substantially electrically insulated from the ground due to a tire having low conductivity, and hence electric charge (in general, positive electric charge) is charged to a vehicle body or the like when static electricity is generated in the vehicle. Radio noise is liable to be generated when the electric charge is charged to the vehicle body or the like. Therefore, a structure for reducing electric charge that is charged to a vehicle through the passage of an electric current has been investigated hitherto, and various structures have been proposed.

For example, in Japanese Patent Application Laid-open No. 2009-181694, there is disclosed an electrostatic eliminator having such a configuration that charged silicon is filled into a case in which ceramic bodies are arranged densely in a radial fashion, and one of conductive wires connected to both sides of the case is connected to a minus terminal of a battery and the other conductive wire is connected to a vehicle body. In this type of the electrostatic eliminator, static electricity of the vehicle body is neutralized by grounding, and thus the electric charge that is charged to the vehicle body can be reduced.

The related-art electrostatic eliminator as disclosed in Japanese Patent Application Laid-open No. 2009-181694 has a complicated structure, and hence the electrostatic eliminator is required to be connected to the minus terminal of the battery and the vehicle body through the conductive wires, with the result that an installation space for the electrostatic eliminator is also required.

Incidentally, the vehicle includes damping force generation devices configured to damp vibrations of the vehicle body. Each of the damping force generation devices includes a shock absorber having a cylinder and a piston fitted to the cylinder in a reciprocally movable manner. The shock absorber is coupled to a sprung member and an unsprung member of the vehicle at a rod part of the piston and the cylinder, respectively, and generates the damping force due to a flow resistance when oil passes through orifices formed in the piston along with relative displacement between the sprung member and the unsprung member.

Experimental research conducted by the inventors of the present invention has revealed that an adverse effect on the vehicle exerted by electric charge that is charged to the vehicle is not limited to the increase in the risk of generation of radio noise. In other words, when the electric charge is charged to the vehicle, the electric charge is also charged to the oil in the shock absorbers. As a result, the viscosity of the oil is increased so that damping forces are liable to become excessive.

The related-art electrostatic eliminator as disclosed in Japanese Patent Application Laid-open No. 2009-181694 is restricted in terms of an installation location, and cannot thus be installed at a location for effectively reducing the electric charge that is charged to the oil in the shock absorbers. Therefore, the excessive damping force resulting from the increase in the viscosity of the oil caused by the charging of the electric charge cannot be effectively prevented by the related-art electrostatic eliminator.

SUMMARY OF THE INVENTION

The present invention has been made in view of the above-mentioned phenomenon and the cause of the phenomenon, which have not been recognized hitherto. It is a primary object of the present invention to prevent electric charge from being excessively charged to oil in a shock absorber, thereby preventing viscosity of the oil from being increased by the charging of the electric charge to generate an excessive damping force.

According to one embodiment of the present invention, there is provided a damping force generation device for a vehicle, including a shock absorber including: a cylinder; and a piston fitted into the cylinder in a reciprocally movable manner to form two cylinder chambers in cooperation with the cylinder, the shock absorber being coupleable to one of a sprung member and an unsprung member of the vehicle at a rod part of the piston, and to another one of the sprung member and the unsprung member at the cylinder, the shock absorber being configured to generate a damping force due to a flow resistance when a working liquid passes through an orifice formed in a main body part of the piston to move between the two cylinder chambers along with relative displacement between the sprung member and the unsprung member.

The damping force generation device for a vehicle further includes a self-discharge type charge eliminator provided on a surface of a specific member being at least one of a member constructing the shock absorber or an auxiliary member connected to the shock absorber. The self-discharge type charge eliminator is an air-ion conversion self-discharge type charge eliminator configured to reduce a charge amount of positive electric charge, which is charged to the specific member, through diselectrification carried out by changing air around the air-ion conversion self-discharge type charge eliminator into negative air ions depending on the charge amount of the specific member, and by causing the negative air ions to be attracted to the positive electric charge of the specific member to neutralize the positive electric charge, to thereby reduce a charge amount of the working liquid.

A reason for the charging of the electric charge to the working liquid such as the oil in the shock absorber when the electric charge is charged to the vehicle body and the like, and a cause of the increase in the viscosity of the working fluid when the electric charge is charged to the working liquid are not necessarily apparent, but major reason and cause are considered as follows. The shock absorber is coupled to one of and another one of the sprung member and the unsprung member of the vehicle at the rod part of the piston and the cylinder, respectively. Thus, when the electric charge is charged to the vehicle body or the like, the electric charge moves to the piston and the cylinder through the sprung member and the unsprung member, respectively. When the amount of the electric charge that is charged to the piston and the cylinder is increased, a part of the electric charge moves to the working liquid in the shock absorber. As a result, the electric charge is charged to the working liquid. It is presumed that when the electric charge is charged to the working liquid, a degree of freedom of molecules of the working liquid is reduced, which increases the viscosity of the working liquid.

According to the above-mentioned configuration, the damping force generation device for a vehicle includes the self-discharge type charge eliminator provided on the surface of the specific member being at least one of the member constructing the shock absorber or the auxiliary member connected to the shock absorber. The charge eliminator reduces the charge amount of the specific member through diselectrification carried out by changing the air around the charge eliminator into negative air ions, and by causing the negative air ions to be attracted to the positive electric charge of the specific member to neutralize the positive electric charge. Thus, the charge amount of the working liquid is reduced through the movement of the electric charge that is charged to the working liquid in the shock absorber to the specific member, thereby being capable of preventing such a state that the viscosity of the working liquid is increased by the excessive charging of the electric charge to generate the excessive damping force.

Note that, according to the above-mentioned configuration, an electrostatic eliminator having a complicated structure may be omitted, and hence the electrostatic eliminator need not be connected to a minus terminal of a battery or a vehicle body through conductive wires. Further, the self-discharge type charge eliminator may be, for example, a thin conductive body capable of carrying out so-called self-discharge through use of electric charge that is charged to the specific member, and hence a large space as in the case of installing the electrostatic eliminator is not required.

According to one embodiment of the present invention, the specific member is a dust boot made of a resin as the auxiliary member connected to the rod part, the self-discharge type charge eliminator is provided on a surface of the dust boot, and the rod part and the dust boot are connected to each other so that the positive electric charge is movable from the rod part to the dust boot.

According to the above-mentioned embodiment, the self-discharge type charge eliminator is provided on the surface of the dust boot. The dust boot is made of a resin, to which the electric charge is charged more easily than to a metal. Further, the rod part and the dust boot are connected to each other so that the electric charge is movable from the rod part to the dust boot. Thus, the dust boot is diselectrified by the self-discharge type charge eliminator so that the electric charge that is charged to the piston moves to the dust boot via the rod part, and the electric charge that is charged to the working liquid thus moves to the piston. Thus, the charge amount of the working liquid can be reduced, thereby being capable of preventing such a state that the viscosity of the working liquid is increased by the excessive charging of the electric charge to generate the excessive damping force.

According to one embodiment of the present invention, the shock absorber is a twin-tube shock absorber including: an inner cylinder to which the piston is fitted; and an outer cylinder surrounding the inner cylinder, the specific member is the outer cylinder, and the self-discharge type charge eliminator is provided on a surface of the outer cylinder below a liquid level of the working liquid between the inner cylinder and the outer cylinder when the vehicle is in a standard load state.

According to the above-mentioned embodiment, in the twin-tube shock absorber, the self-discharge type charge eliminator is provided on the surface of the outer cylinder below the liquid level of the working liquid between the inner cylinder and the outer cylinder when the vehicle is in the standard load state. Thus, compared to a case where the self-discharge type charge eliminator is provided on the surface of the outer cylinder above the liquid level of the working liquid between the inner cylinder and the outer cylinder, the working liquid between the inner cylinder and the outer cylinder can efficiently be diselectrified. Thus, the inner cylinder can efficiently be diselectrified so that the electric charge that is charged to the working liquid in the inner cylinder can efficiently be moved to the inner cylinder, and the working liquid in the inner cylinder can thus efficiently be diselectrified.

According to one embodiment of the present invention, the shock absorber is a twin-tube shock absorber including: an inner cylinder to which the piston is fitted; an outer cylinder surrounding the inner cylinder to form a reservoir chamber between the inner cylinder and the outer cylinder; a base valve assembly; and an end cap closing end portions of the inner cylinder and the outer cylinder to define a base valve chamber communicating with the reservoir chamber in cooperation with the base valve assembly, the specific member is at least one of the outer cylinder or the end cap, and the positive electric charge is movable from the inner cylinder to the specific member.

According to the above-mentioned embodiment, in the twin-tube shock absorber, the self-discharge type charge eliminator is provided on the surface of at least one of the outer cylinder or the end cap, which is the specific member, and the electric charge is movable from the inner cylinder to the specific member. When the specific member is diselectrified by the charge eliminator, the electric charge moves from the inner cylinder to the specific member so that the electric potential of the inner cylinder is reduced. Thus, the electric charge that is charged to the working liquid in the inner cylinder moves to the inner cylinder. Thus, the charge amount of the working liquid in the inner cylinder can be reduced, thereby being capable of preventing such a state that the viscosity of the working liquid is increased by the excessive charging of the electric charge to generate the excessive damping force.

According to one embodiment of the present invention, the shock absorber is a mono-tube shock absorber, the specific member is the cylinder, and the self-discharge type charge eliminator is provided on a surface of the cylinder so that at least a part of the self-discharge type charge eliminator is positioned within a predetermined range corresponding to a range in a direction of the relative displacement, in which the main body part of the piston exists when the vehicle is in a standard load state.

According to the above-mentioned embodiment, in the mono-tube shock absorber, the self-discharge type charge eliminator is provided on the surface of the cylinder. Thus, when the cylinder is diselectrified by the charge eliminator, the electric potential of the cylinder is reduced. Consequently, the electric charge that is charged to the working liquid moves to the cylinder. Thus, the charge amount in the working liquid can be reduced, thereby being capable of preventing such a state that the viscosity of the working liquid is increased by the excessive charging of the electric charge to generate the excessive damping force. Further, compared to a case where the self-discharge type charge eliminator is provided on the surface of the cylinder outside the predetermined range, the diselectrification for the working liquid existing around the main body part of the piston in which the orifice is formed can efficiently be carried out.

According to one embodiment of the present invention, the shock absorber is a variable damping force shock absorber including: a bypass passage for bypassing the main body part of the piston to connect the two cylinder chambers to each other; a variable orifice formed in the bypass passage; and an effective passage cross sectional area changing device configured to change an effective passage cross sectional area of the variable orifice, the variable damping force shock absorber being configured such that, when the piston is displaced with respect to the cylinder, at least a part of the working liquid in one of the two cylinder chambers moves to another one of the two cylinder chambers through the bypass passage, the specific member is the effective passage cross sectional area changing device, and the positive electric charge is movable from the working liquid passing through the bypass passage to the effective passage cross sectional area changing device.

According to the above-mentioned embodiment, in the variable damping force shock absorber, the self-discharge type charge eliminator is provided on the surface of the effective passage cross sectional area changing device configured to change the effective passage cross sectional area of the variable orifice formed in the bypass passage. Further, the electric charge can move from the working liquid passing through the bypass passage to the effective passage cross sectional area changing device. Thus, the effective passage cross sectional area changing device is diselectrified by the self-discharge type charge eliminator so that the electric charge that is charged to the working liquid moves to the effective passage cross sectional area changing device, and the electric charge that is charged to the working liquid passing through the bypass passage is thus reduced. Thus, it is possible to prevent such a state that the viscosity of the working liquid passing through the variable orifice is increased by the excessive charging of the electric charge to generate the excessive damping force.

According to one embodiment of the present invention, the self-discharge type charge eliminator includes: a conductive metal foil having a large number of minute protrusions and recesses formed on a side surface on an outer periphery of the conductive metal foil; and a layer of an adhesive applied to one surface of the conductive metal foil, and the self-discharge type charge eliminator is fixed to the specific member by bonding with the layer of the adhesive.

According to the above-mentioned embodiment, the metal foil for the diselectrification can easily be fixed by the bonding to the surface of the specific member. Further, the metal foil is brought into close contact with the specific member through intermediation of the layer of the adhesive across the entire surface, and hence the electric charge can efficiently be moved from the specific member to the metal foil, thereby being capable of enhancing the effect of the diselectrification.

BRIEF DESCRIPTION OF THE DRAWINGS

FIG. 7A and FIG. 7B are schematic explanatory views for illustrating a mechanism of diselectrification by the self-discharge type charge eliminator, in which FIG. 7A is a cross sectional view, and FIG. 7B is a plan view.

DETAILED DESCRIPTION OF THE PREFERRED EMBODIMENTS

Now, with reference to the accompanying drawings, preferred embodiments of the present invention are described in detail.

First Embodiment

Figure 1:
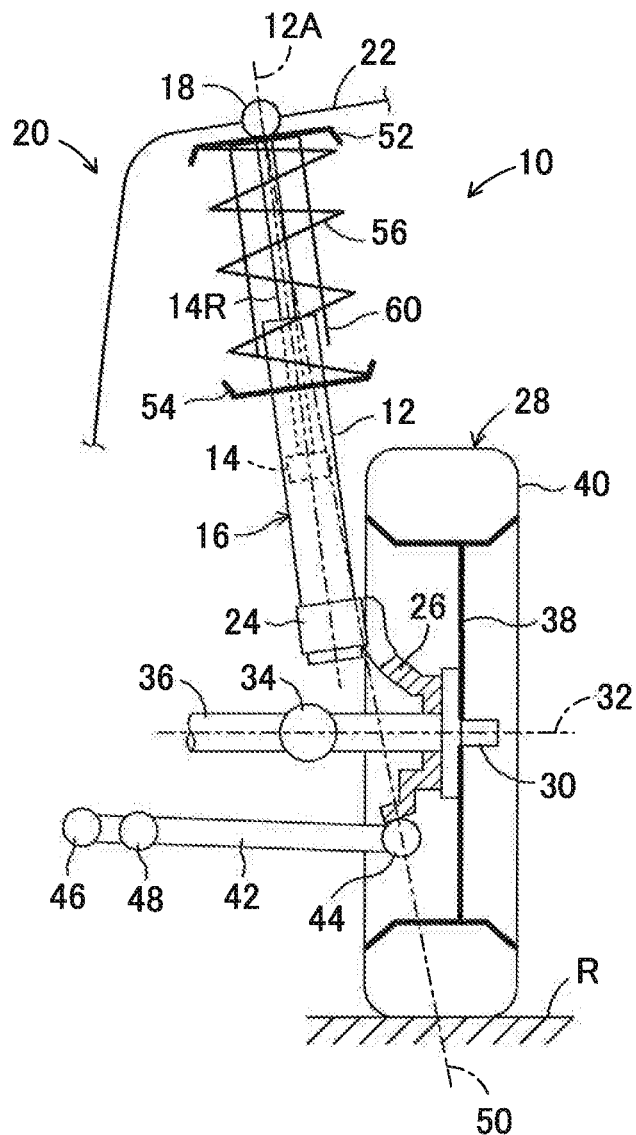
FIG. 1 is a schematic view for illustrating a damping force generation device according to a first embodiment of the present invention applied to a MacPherson strut front suspension when viewed from the rear of a vehicle.
Figure 2:
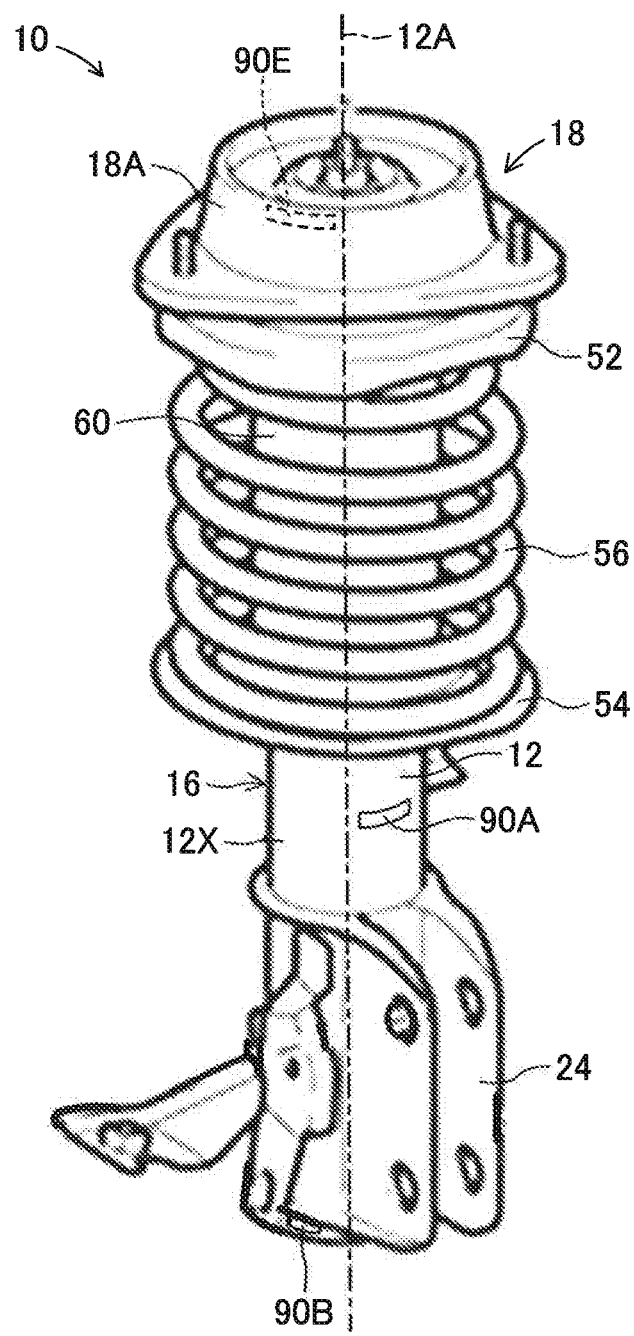
FIG. 2 is a perspective view of the damping force generation device illustrated in FIG. 1.
Figure 3:
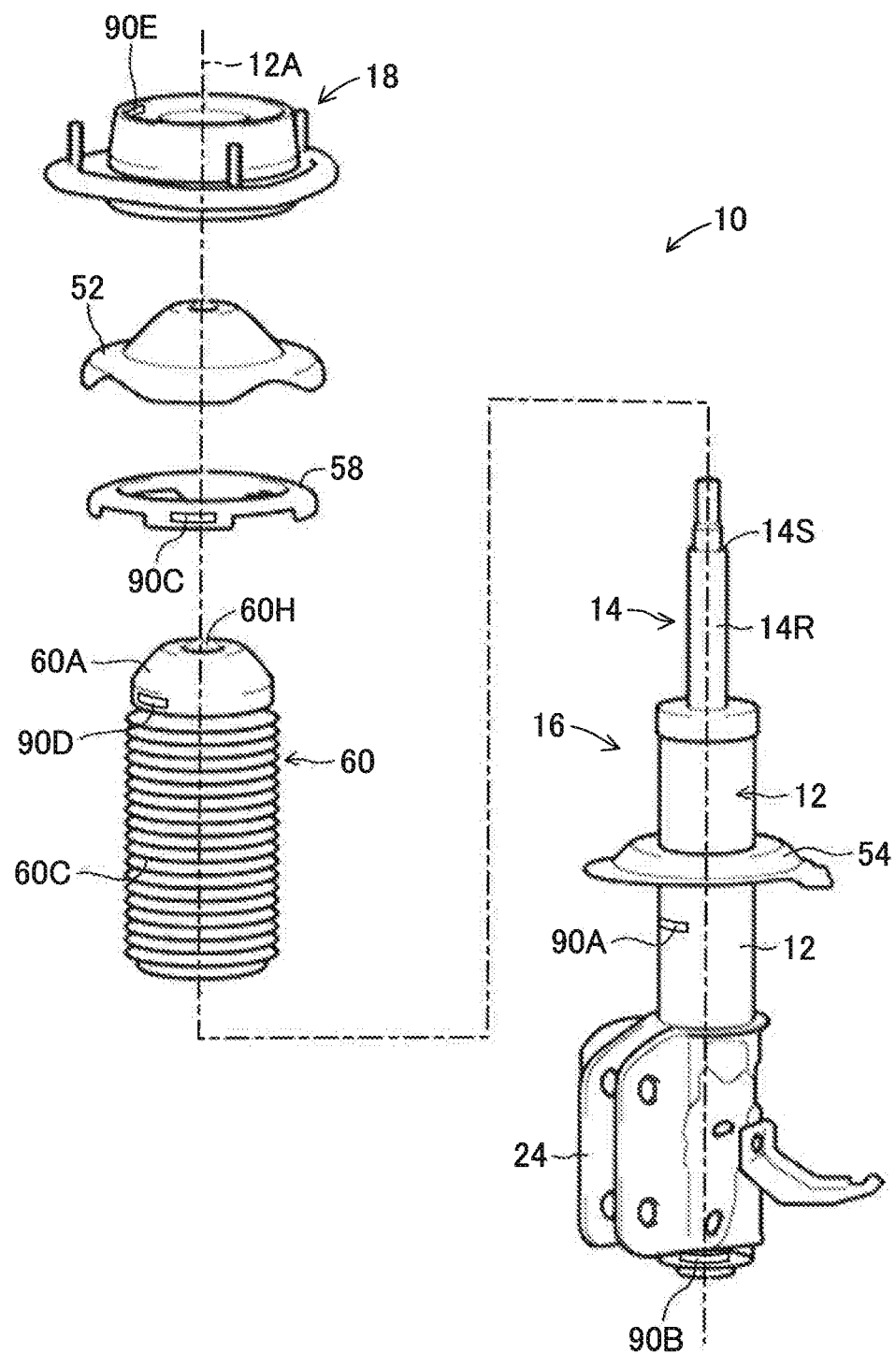
FIG. 3 is an exploded perspective view of the damping force generation device illustrated in FIG. 1.

FIG. 1 is a schematic view for illustrating a damping force generation device 10 according to a first embodiment of the present invention applied to a MacPherson strut front suspension when viewed from the rear of a vehicle. FIG. 2 is a perspective view of the damping force generation device 10 illustrated in FIG. 1. FIG. 3 is an exploded perspective view of the damping force generation device 10 illustrated in FIG. 1.

In FIG. 1 to FIG. 3, the damping force generation device 10 includes a shock absorber 16 including a cylinder 12 and a piston 14. The piston 14 is fitted to the cylinder 12 so as to be reciprocally movable with respect to the cylinder 12 along an axis 12A. The cylinder 12 and the piston 14 are made of a metal such as steel. A rod part 14R of the piston 14 extends upward through a top end of the cylinder 12. Note that, members described below are made of a conductive metal such as steel except for members whose forming materials are particularly described. Metal members including the cylinder 12 and the piston 14 are coated for increasing durability, and surfaces are covered by non-conductive coating films.

The shock absorber 16 is coupled to a vehicle body 22 serving as a sprung member of a vehicle 20 at a top end portion of the rod part 14R through intermediation of an upper support 18, and is coupled to a wheel carrier 26 serving as an unsprung member of the vehicle 20 through intermediation of a bracket 24 fixed to a bottom end portion of the cylinder 12. As widely known, the upper support 18 supports the rod part 14R through use of a rubber bush device arranged inside a casing 18A. The wheel carrier 26 supports a spindle 30 of a wheel 28 so as to be rotatable about a rotational axis 32 through intermediation of a bearing (not shown). Note that, the bottom end portion of the shock absorber 16 may be coupled to the wheel carrier 26 or a suspension member in a relatively movable manner through intermediation of coupling means such as a rubber bush device (not shown).

In the illustrated embodiment, the wheel 28 is a steered wheel, and is also a driving wheel. A drive shaft 36 is coupled to the spindle 30 through intermediation of a universal joint 34. The wheel 28 includes a wheel member 38 mounted to a flange part of the spindle 30 and a tire 40 made of rubber and the like, which is assembled on an outer periphery of the wheel member 38. Note that, the wheel to which the damping force generation device according to the present invention is applied may be a non-steered wheel or a driven wheel, and may further be a rear wheel.

An outer end of a control arm (lower arm) 42 is coupled to a bottom end portion of the wheel carrier 26 in a pivotable manner through intermediation of a ball joint 44. In the illustrated embodiment, the control arm 42 is an L-shaped arm having an inner end and a rear end in addition to the outer end. The inner end and the rear end are supported in a swingable manner by brackets (not shown) of the vehicle body respectively through intermediation of rubber bush devices 46 and 48. A center of a ball part of the ball joint 44 provided on the outer end of the control arm 42 and a center of the upper support 18 cooperate to define a kingpin axis 50. Thus, the wheel 28 is driven about the kingpin axis 50 by a steering device (not shown) through intermediation of a tie rod, thereby being steered.

Although the illustration is omitted, the top end portion of the rod part 14R of the piston 14 extends through an upper spring seat 52. As described later referring to FIG. 3, the upper spring seat 52 is fixed to the rod part 14R so as to abut at a top surface against a bottom surface of the upper support 18. Between the upper spring seat 52 and a lower spring seat 54 fixed to the cylinder 12, a compression coil spring 56 is elastically mounted as a suspension spring.

As understood from the above description, the damping force generation device 10 is applied to the MacPherson strut front suspension. The shock absorber 16, the upper support 18, the compression coil spring 56, and the like cooperate with one another to construct the MacPherson strut. Thus, when the wheel carrier 26 vertically moves as a result of a bound and a rebound of the wheel 28, the control arm 42 swings in the vertical direction about the rubber bush devices 46 and 48 so that the shock absorber 16 expands and contracts, and the compression coil spring 56 elastically deforms.

As illustrated in FIG. 3, the top end portion of the rod part 14R passes through a spring seat cushion 58 and the top end of a dust boot 60 located below the upper spring seat 52. The spring seat cushion 58 and the dust boot 60 are auxiliary members of the shock absorber 16, which are sandwiched between the upper spring seat 52 and a shoulder part 14S of the rod part 14R to be connected to the rod part 14R in a fixed manner, and are formed through use of a resin. The spring seat cushion 58 abuts against a bottom surface of the upper spring seat 52 at a top surface of an outer peripheral portion.

In particular, in the illustrated embodiment, the dust boot 60 includes a cylindrical part 60C extending along the cylinder 12 and the rod part 14R around the cylinder 12 and the rod part 14R, and a mounting part 60A in an inverted bowl shape integrally formed with a top end of the cylindrical part 60C. The mounting part 60A closes the top end of the dust boot 60 except for a hole 60H through which the rod part 14R is inserted, and is in close contact with the rod part 14R on a wall surface of the hole 60H. The cylindrical part 60C is formed into a bellows shape so as to allow expansion and contraction, and is compressed and deformed when a compression load along the axis 12A is applied.

Figure 4:
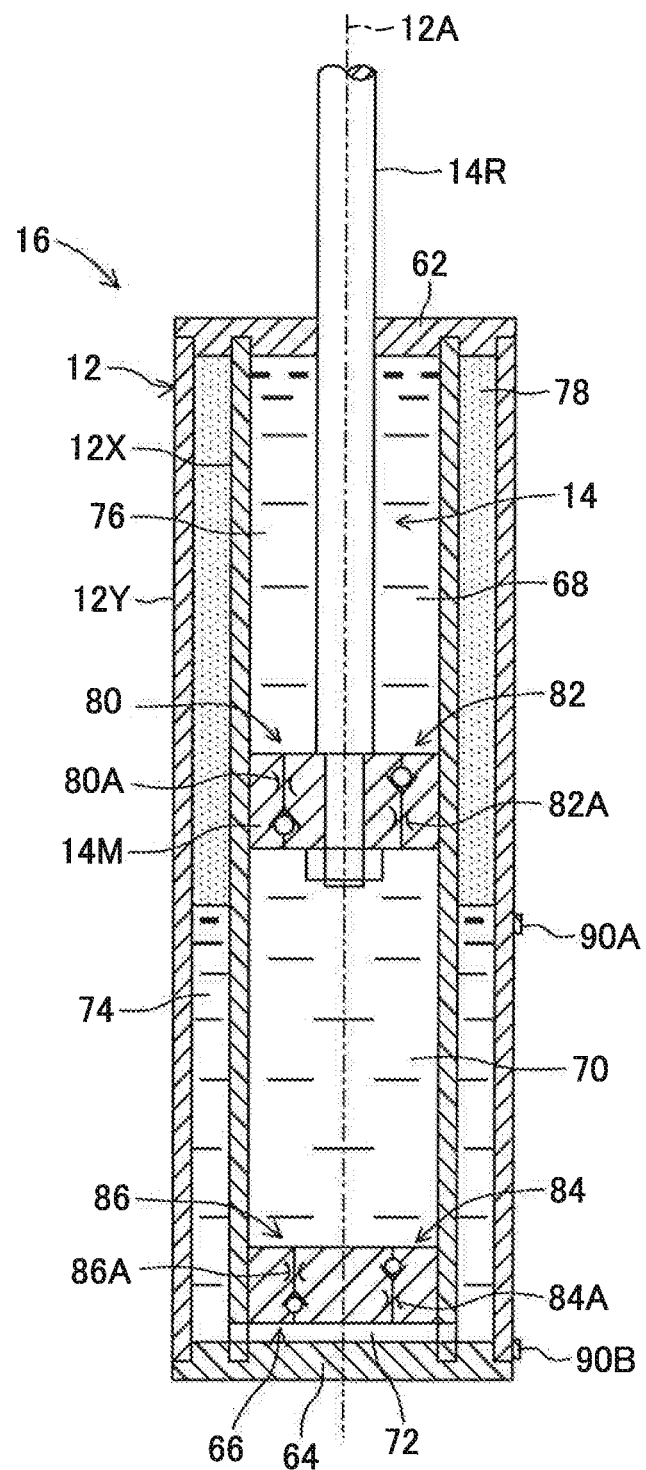
FIG. 4 is an enlarged cross sectional view for illustrating an overview of a twin-tube shock absorber illustrated in FIG. 1.

As schematically illustrated in FIG. 4, the shock absorber 16 is a twin-tube shock absorber. The cylinder 12 includes an inner cylinder 12X and an outer cylinder 12Y each extending coaxially along the axis 12A. The inner cylinder 12X and the outer cylinder 12Y are integrally coupled to each other through intermediation of end caps 62 and 64 respectively at a top end and a bottom end. The rod part 14R of the piston 14 passes through the end cap 62 and extends to the outside of the cylinder 12. The end cap 64 closes the bottom end of the cylinder 12. In the inner cylinder 12X, a base valve assembly 66 is arranged close to the end cap 64, and is fixed to the inner cylinder 12X.

A main body part 14M of the piston 14 is closely fitted to the inner cylinder 12X so as to be reciprocally movable along the axis 12A. The main body part 14M cooperates with the inner cylinder 12X and the end cap 62 to form an upper cylinder chamber 68, and cooperates with the inner cylinder 12X and the base valve assembly 66 to form a lower cylinder chamber 70. The base valve assembly 66 forms a base valve chamber 72 between the base valve assembly 66 and the end cap 64. The base valve chamber 72 communicates with an annular chamber 74 between the inner cylinder 12X and the outer cylinder 12Y.

In the upper cylinder chamber 68, the lower cylinder chamber 70, the base valve chamber 72, and the annular chamber 74, oil 76 serving as a working liquid is filled. Gas 78 such as nitrogen is sealed in an upper part of the annular chamber 74. As the shock absorber 16 expands and contracts, a volume of the rod part 14R existing in the cylinder 12 changes, and hence the gas 78 in the annular chamber 74 absorbs the change in the volume of the rod part 14R existing in the cylinder 12.

In the main body part 14M of the piston 14, a damping force generation valve 80 for an expansion stroke and a damping force generation valve 82 for a contraction stroke are provided. The damping force generation valve 80 for an expansion stroke has an orifice 80A, thereby allowing only a flow of the oil 76 from the upper cylinder chamber 68 toward the lower cylinder chamber 70. A damping force in the expansion stroke is generated due to a flow resistance at the time of passage of the oil 76 through the orifice 80A. Similarly, the damping force generation valve 82 for a contraction stroke has an orifice 82A, thereby allowing only a flow of the oil 76 from the lower cylinder chamber 70 toward the upper cylinder chamber 68. A damping force in the contraction stroke is generated due to a flow resistance at the time of passage of the oil 76 through the orifice 82A.

Also in the base valve assembly 66, a damping force generation valve 84 for an expansion stroke and a damping force generation valve 86 for a contraction stroke are provided. The damping force generation valve 84 for an expansion stroke has an orifice 84A, thereby allowing only a flow of the oil 76 from the base valve chamber 72 toward the lower cylinder chamber 70. A damping force in the expansion stroke is generated due to a flow resistance at the time of passage of the oil 76 through the orifice 84A. Similarly, the damping force generation valve 86 for a contraction stroke has an orifice 86A, thereby allowing only a flow of the oil 76 from the lower cylinder chamber 70 toward the base valve chamber 72. A damping force in the contraction stroke is generated due to a flow resistance at the time of passage of the oil 76 through the orifice 86A.

As illustrated in FIG. 2 and FIG. 3, self-discharge type charge eliminators 90A and 90B each in a strip shape are fixed by bonding to surfaces of a center portion and a bottom end portion in the longitudinal direction of the outer cylinder 12Y of the cylinder 12 so as to extend in a circumferential direction. As illustrated in FIG. 3, self-discharge type charge eliminators 90C and 90D each in a strip shape are fixed by bonding to an outer peripheral portion of the spring seat cushion 58 and an outer peripheral portion of the mounting part 60A of the dust boot 60 so as to extend in the circumferential direction. Further, a self-discharge type charge eliminator 90E in a strip shape is fixed by bonding to a top surface of the casing 18A of the upper support 18 so as to extend in a direction perpendicular to a radial direction.

Note that, a position of the piston 14 illustrated in FIG. 4 is a position when the vehicle is in a standard load state, and the wheel 28 is not bounding or rebounding (hereinafter referred to as "standard position"). In the illustrated embodiment, the self-discharge type charge eliminator 90A is fixed to the surface of the outer cylinder 12Y of the cylinder 12 below a liquid level of the oil 76 in the annular chamber 74 when the piston 14 is at the standard position.

Figure 5:
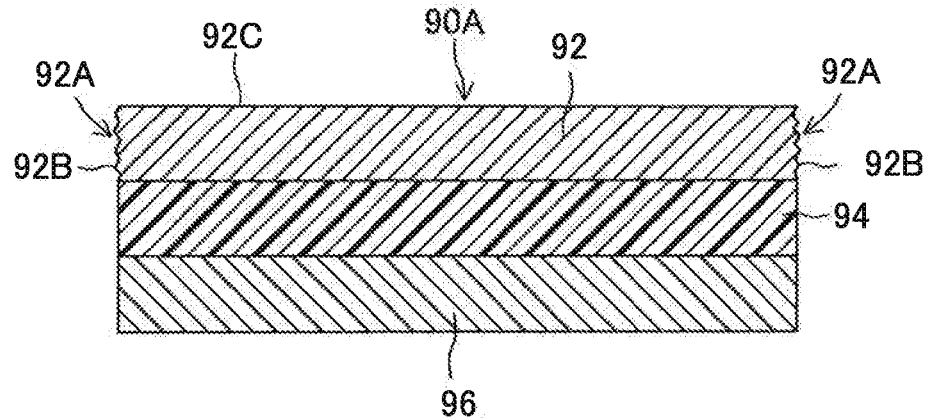
FIG. 5 is an enlarged cross sectional view for illustrating a self-discharge type charge eliminator before bonding.

The self-discharge type charge eliminators 90A to 90E have the same structure. Thus, referring to FIG. 5 for illustrating a cross section of the charge eliminator 90A before the bonding, a description is only given of the charge eliminator 90A. The charge eliminator 90A is formed by shearing, into predetermined size and shape, a composite sheet obtained by applying a conductive pressure-sensitive adhesive 94 to a conductive metal foil 92 and attaching a release sheet 96 covering the adhesive 94 to the adhesive 94. The charge eliminator 90A is fixed to the member to be diselectrified by removing the release sheet 96 and bonding the metal foil 92 to the member with the adhesive 94.

As described later in detail, a side surface 92A of the metal foil 92, that is, a surface of the metal foil 92 extending in a thickness direction thereof mainly serves as a discharge surface in a diselectrification phenomenon described later. Therefore, it is preferred that the side surface 92A of the metal foil 92 have a large number of convex portions 92B such as minute protruding portions so that the diselectrification phenomenon occurs efficiently. Further, the plurality of convex portions such as the minute protruding portions may be formed on a surface 92C (upper surface of FIG. 5) of the metal foil 92 by subjecting the surface 92C to processing of increasing surface roughness.

As described later in detail, although the metal foil 92 may be formed of any metal having conductivity, it is preferred that the metal foil 92 be formed of aluminum, gold, silver, copper, or an alloy thereof. In particular, in the case where the charge eliminator is fixed to a metal member as in this embodiment, it is preferred that the metal foil of the charge eliminator have higher conductivity than a metal material forming the metal member. Further, it is preferred that the metal foil 92 have a thickness of from about 50 μm to about 200 μm so that the side surface 92A of the metal foil 92 have a thickness large enough to serve as the discharge surface sufficiently, and the metal foil 92 can be flexibly deformed so as to fit a curved surface to which the metal foil 92 is to be fixed.

Note that, a planar shape of the charge eliminator 90A is not limited to a strip-shaped rectangle and may be any shape other than a rectangle, such as a polygon, a circle, or an oval. It is preferred that the charge eliminator 90A have a shape that can be sheared without leaving a portion to be discarded, for example, a rectangle, a square, a rhomboid, or a hexagon. Further, the size of the charge eliminator 90A may be appropriately set in accordance with a region to which the charge eliminator 90A is applied. In the case where the charge eliminator 90A has, for example, a rectangular shape, a short side may be from about several millimeters to about more than 10 mm, and a long side may be from about several tens of millimeters to about 100 mm.

As described above, when the vehicle 20 travels, the positive electric charge is charged to the vehicle, and hence the positive electric charge is also charged to members such as the shock absorber 16 constructing the damping force generation device 10. In general, the charge amount of the electric charge is higher for a resin member than for a metal member, and lower for the oil than for the metal member. In the case of the damping force generation device 10, the charge amounts of the resin spring seat cushion 58 and the resin dust boot 60 are more than the charge amounts of the metal piston 14 and the metal cylinder 12, but the charge amount of the oil 76 is less than the charge amounts of the piston 14 and the cylinder 12.

Figure 6:
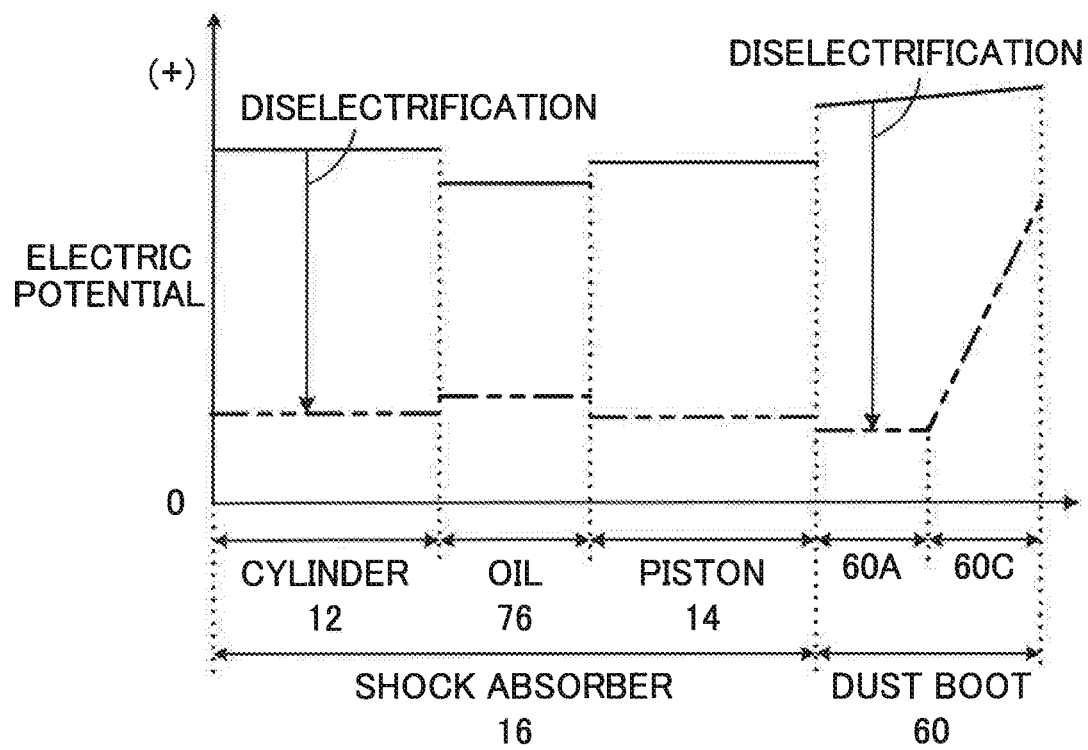
FIG. 6 is a chart for illustrating a relationship among electric potentials caused by charging of positive electric charge to a dust boot, a piston, a cylinder, and oil in the shock absorber.

Thus, when diselectrification is not carried out by the charge eliminator 90A and the like, a relationship in the electric potential caused by the positive electric charge that is charged to the dust boot 60, the piston 14, the cylinder 12, and the oil 76 is considered to be a relationship indicated by the solid line of FIG. 6. As described above, the positive electric charge is generated on and charged to the wheel 28 by the tire 40 repeating the contact and the separation to and from the road surface. The cylinder 12 is coupled to the wheel carrier 26 configured to support the wheel 28, and the charge amount of the electric charge to the cylinder 12 is more than that of the piston 14.

The oil 76 is the lowest in the electric potential among the above-mentioned members and parts. When the charge amounts of the cylinder 12 and the piston 14 are increased, the electric charge that is charged to those members moves to the oil 76. Consequently, the charge amount of the oil 76 is also increased, thereby increasing the viscosity of the oil 76. When the viscosity of the oil 76 is increased, the flow resistance at the time of the passage of the oil 76 through the orifice 80A and the like is also increased, and hence the damping force becomes more than an original value, with the result that the ride comfort of the vehicle is degraded. Therefore, the charge amount of the oil 76 is preferably reduced through the diselectrification by the charge eliminator 90A and the like.

Figure 7A:
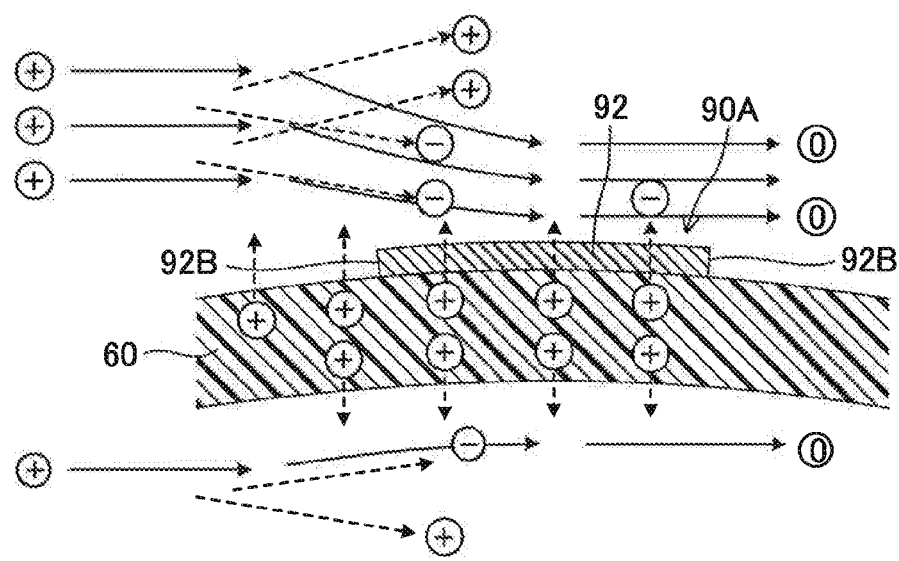
Figure 7B:
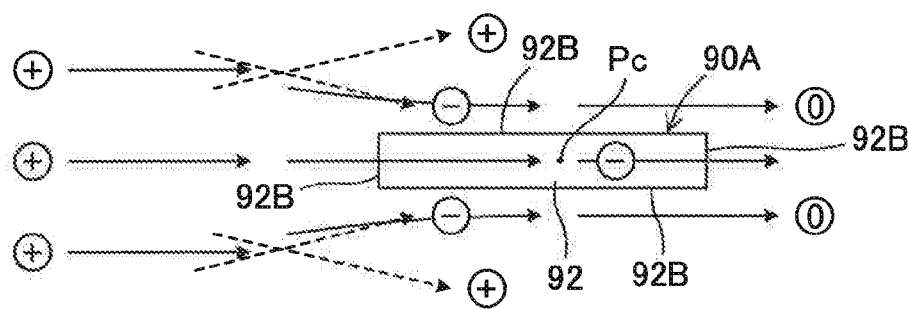

FIG. 7A and FIG. 7B are schematic explanatory views for illustrating a mechanism of diselectrification by the charge eliminator 90A, and the diselectrification by the charge eliminator 90A is assumed to be carried out by the mechanism illustrated in FIG. 7A and FIG. 7B. Note that, in FIG. 7A and FIG. 7B, the symbols "+" and "−" respectively denote positive and negative electric charges or ions, and the symbol "0" denotes electric charge of 0, that is, an electrically neutralized state. Further, the solid arrows denote the flow of air, and the broken arrows denote the movement of the electric charges or ions.

Air is charged with positive electric charge. However, when the charge amount of the positive electric charge in the resin dust boot 60 is excessively increased, air is separated into positive air ions and negative air ions due to the so-called corona discharge. The positive air ions move away from the dust boot 60 due to the repulsive force that acts between the positive air ions and the positive electric charge that is charged to the dust boot 60. In contrast, the negative air ions are attracted to the dust boot 60 due to the Coulomb's force that acts between the negative air ions and the positive electric charge that is charged to the dust boot 60, with the result that the negative air ions move closer to the dust boot 60, and the positive electric charge that is charged to the dust boot 60 moves closer to the negative air ions.

As a result, electrical neutralization is caused between the negative air ions and the positive electric charge, and the negative air ions and the positive electric charge disappear, with the result that the electric charge of air becomes 0. The above-mentioned phenomenon repeatedly occurs continuously, and hence the positive electric charge that is charged to the dust boot 60 is reduced to dielectrify the dust boot 60. Note that, the phenomenon in which air is separated into positive air ions and negative air ions due to the corona discharge or the like becomes more active as the charge amount of the dust boot 60 is higher, and thus it is assumed that the function of dielectrification becomes more active as the charge amount is higher. Further, the dielectrification by the charge eliminator 90A is not limited to a situation in which air flows in one direction as illustrated in FIG. 7A and FIG. 7B.

According to the result of the experimental investigation conducted by the inventors of the present invention, in the case where the metal foil 92 (aluminum foil having a thickness of 200 μm) of the charge eliminator 90A has a rectangular shape having the above-mentioned dimensions or another shape having a similar size, the range in a surface direction in which the effect of the above-mentioned dielectrification is exerted is a range of a radius of about 50 mm from a center Pc of the metal foil 92. Further, the range in a thickness direction in which the effect of the dielectrification is exerted is a range of from about several millimeters to about more than 10 mm from the bonded surface of the metal foil 92 within the range in the surface direction in which the effect of the dielectrification is exerted. Note that, the range in which the effect of the dielectrification is exerted varies depending on the state of the charge amount of the positive electric charge or the like.

In terms of a general charge state of the vehicle 20, among portions at which the spring seat cushion 58 and the upper spring seat 52 abut against each other, a portion closest to the center Pc of the metal foil 92 of the charge eliminator 90C falls within the range in the surface direction in which the effect of the dielectrification is exerted along the top surface of the dust boot 60. Similarly, among portions at which the dust boot 60 and the rod part 14R abut against each other, a portion closest to the center Pc of the metal foil 92 of the charge eliminator 90D falls within the range in the surface direction in which the effect of the dielectrification is exerted along the top surface of the dust boot 60. Further, the outer cylinder 12Y of the cylinder 12 falls within a range in the thickness direction in which the effect of the dielectrification by the charge eliminators 90A and 90B is exerted. The casing 18A of the upper support 18 falls within a range in the thickness direction in which the effect of the dielectrification by the charge eliminator 90E is exerted.

As indicated by the long dashed double-short dashed line of FIG. 6, the positive electric charge that is charged to the dust boot 60 is reduced through the dielectrification by the charge eliminator 90D, and the electric potential of the dust boot 60 is thus reduced. Thus, the positive electric charge that is charged to the piston 14 moves to the dust boot 60 to be reduced, and the electric potential of the piston 14 is thus reduced. The electric potential of the piston 14 is reduced also through the dielectrification by the charge eliminators 90C and 90E, which respectively reduce the electric potential of the spring seat cushion 58 and the upper spring seat 52, resulting in reduction in the electric potential of the casing 18A of the upper support 18. Further, the positive electric charge that is charged to the outer cylinder 12Y is reduced through the dielectrification by the charge eliminators 90A and 90B, which reduces the positive electric charge to the entire cylinder 12, resulting in reduction in the electric potential of the cylinder 12.

Note that, in a case of a coated metal member such as the outer cylinder 12Y, electric charge is charged to a coating film, but the electric charge that is charged to the coating film close to the charge eliminator moves to the charge eliminator to be reduced. Moreover, electric charge that is charged to a metal member moves to the charge eliminator through the coating film to be reduced. Further, the electric charge that is charged to the coating film at a portion separated from the charge eliminator once moves to the metal member, moves through the metal member, and moves from the metal member to the charge eliminator through the coating film.

Thus, according to the first embodiment, the positive electric charge that is charged to the oil 76 in contact with the cylinder 12 and the piston 14 of the shock absorber 16 can be moved to the cylinder 12 and the piston 14, thereby being capable of reducing the charge amount of the electric charge to the oil 76. Note that, when the shock absorber 16 expands and contracts, the piston 14 is displaced with respect to the cylinder 12 so that the oil 76 is agitated, and hence the reduction in the positive electric charge is carried out substantially over the entire oil 76. Thus, the positive electric charge can be prevented from being excessively charged to the oil 76, thereby being capable of preventing such a state that the viscosity of the oil 76 is excessively increased by the excessive charging of the electric charge to generate an excessively large damping force of the shock absorber 16.

In particular, according to the first embodiment, the self-discharge type charge eliminator 90A is fixed to the surface of the outer cylinder 12Y of the cylinder 12 below the liquid level of the oil 76 in the annular chamber 74 when the piston 14 is at the standard position. Thus, compared to the case where the charge eliminator 90A is fixed to the surface of the outer cylinder 12Y above the liquid level of the oil 76 in the annular chamber 74, the charge amount of the oil 76 in the annular chamber 74 can efficiently be reduced through the dielectrification for the outer cylinder 12Y. Note that, the charge eliminator 90A may partially or entirely be positioned above the liquid level of the oil 76 in the annular chamber 74 when the piston 14 is at the standard position.

Moreover, according to the first embodiment, the self-discharge type charge eliminator 90B is fixed to the surface of the bottom end portion of the outer cylinder 12Y. Thus, compared to a case where the charge eliminator 90B is not fixed to the surface of the bottom end portion of the outer cylinder 12Y, the charge amount of the inner cylinder 12X can efficiently be reduced via the end cap 64 through the diselectrification for the bottom end portion of the outer cylinder 12Y by the charge eliminator 90B.

Note that, the following effect was able to be verified through an experiment conducted on an actual vehicle by the inventors of the present invention. That is, when the self-discharge type charge eliminators 90A to 90E were not provided, the electric potential of the oil 76 in the inner cylinder 12X was increased to about several hundreds of volts to about one thousand volts. In contrast, according to the configuration of the first embodiment, the electric potential of the oil 76 in the inner cylinder 12X was increased only to about several tens of volts, and appropriate viscosity of the oil 76 was thus able to be secured.

Second Embodiment

Figure 8:
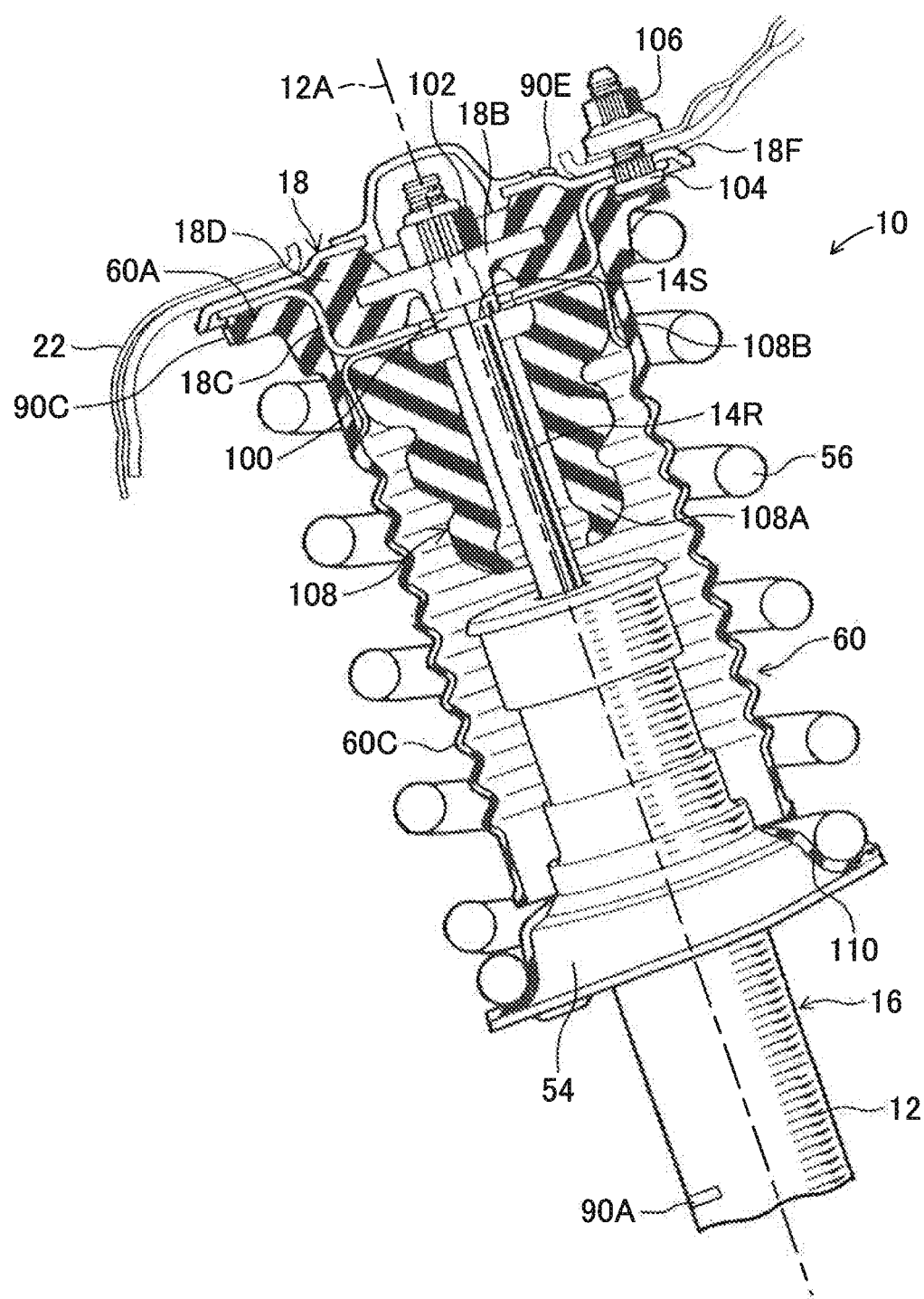
FIG. 8 is a partial cross sectional view for illustrating a main part of a damping force generation device according to a second embodiment of the present invention applied to the MacPherson strut front suspension when viewed from the rear of the vehicle.
Figure 9:
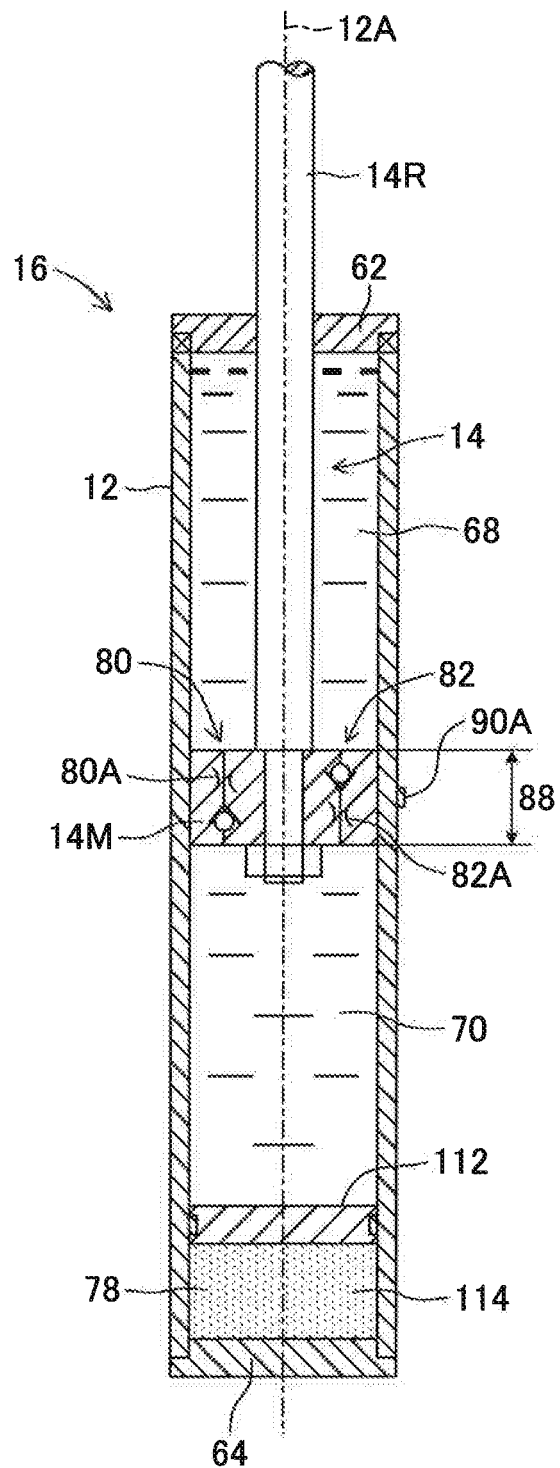
FIG. 9 is a cross sectional view for illustrating an overview of a mono-tube shock absorber illustrated in FIG. 8.

FIG. 8 is a partial cross sectional view for illustrating a main part of a damping force generation device 10 according to a second embodiment of the present invention applied to the MacPherson strut front suspension when viewed from the rear of the vehicle. FIG. 9 is a cross sectional view for illustrating an overview of a mono-tube shock absorber illustrated in FIG. 8. Note that, in FIG. 8 and FIG. 9, members corresponding to the members illustrated in FIG. 1 to FIG. 4 are denoted by the same reference symbols as those placed on FIG. 1 to FIG. 4.

The shock absorber 16 according to the second embodiment is an input separation type shock absorber. The upper support 18 includes an inner tubular member 18B, an outer tubular member 18C, and a rubber bush 18D filled between the inner tubular member 18B and the outer tubular member 18C. A stopper ring 100 is fitted to a distal end of the rod part 14R under a state in which the stopper ring 100 abuts against the shoulder part 14S. The inner tubular member 18B is supported under a state in which the inner tubular member 18B is sandwiched between the stopper ring 100 and a nut 102 threadedly engaging with the distal end of the rod part 14R. As a result, the upper support 18 is coupled to the distal end of the rod part 14R.

The outer tubular member 18C abuts against the vehicle body 22 at a flange part 18F, and is coupled to the vehicle body 22 at the flange part 18F with bolts 104 and nuts 106 threadedly engaging with the bolts 104. A bound stopper 108 is arranged below the outer tubular member 18C. The bound stopper 108 includes a rubber main body 108A and a metal support body 1086 configured to integrally support a top end of the main body 108A. The support body 1086 is joined to a bottom surface of the outer tubular member 18C by welding or the like. Although the illustration is omitted in FIG. 8, at least one of the outer tubular member 18C or the support body 1086 is in contact with the stopper ring 100 or the rod part 14R at a part of an inner peripheral portion directly or through intermediation of a conductive elastic member so as to allow the movement of the electric charge.

The dust boot 60 according to the second embodiment is also made of a resin. A spring seat cushion 60A substantially in an annular plate shape is integrally formed on a top end of the dust boot 60. The spring seat cushion 60A abuts against a bottom surface of the flange part 18F of the outer tubular member 18C. The flange part 18F of the outer tubular member 18C functions similarly to the upper spring seat 52 according to the first embodiment. The spring seat cushion 60A functions similarly to the spring seat cushion 58 according to the first embodiment.

On the lower spring seat 54, a rubber lower spring seat cushion 110 is arranged. The spring seat cushion 60A and the lower spring seat cushion 110 are supported by a spring force of the compression coil spring 56 in such a state that the spring seat cushion 60A and the lower spring seat cushion 110 are pressed respectively against the bottom surface of the flange part 18F of the outer tubular member 18C and a top surface of the lower spring seat 54. The damping force generated by the shock absorber 16 is transmitted from the rod part 14R to the vehicle body 22 via the inner tubular member 18B, the rubber bush 18D, and the outer tubular member 18C. In contrast, the spring force of the compression coil spring 56 is transmitted to the vehicle body 22 via the spring seat cushion 60A and the flange part 18F of the outer tubular member 18C. Thus, the input of the spring force to the vehicle body 22 is separated from the input of the damping force to the vehicle body 22.

As illustrated in FIG. 9, the shock absorber 16 according to this embodiment is the mono-tube shock absorber. A free piston 112 is arranged between the main body part 14M of the piston 14 and the end cap 64 in the cylinder 12. The free piston 112 can be displaced with respect to the cylinder 12 along the axis 12A. The free piston 112 cooperates with the main body part 14M to form the lower cylinder chamber 70, and cooperates with the end cap 64 to form a gas chamber 114. The gas 78 such as nitrogen is sealed in the gas chamber 114. As the shock absorber 16 expands and contracts, a volume of the rod part 14R existing in the cylinder 12 changes, and hence the gas 78 in the gas chamber 114 absorbs the change in the volume of the rod part 14R existing in the cylinder 12.

As in the case of the twin-tube shock absorber illustrated in FIG. 4, in the main body part 14M of the piston 14, the damping force generation valve 80 for an expansion stroke and the damping force generation valve 82 for a contraction stroke are provided. The damping force generation valves 80 and 82 are constructed similarly to the damping force generation valves 80 and 82 according to the first embodiment, and similarly generate the damping forces. As in the first embodiment, the self-discharge type charge eliminator 90A in the strip shape is fixed by bonding to the surface of the center portion in the longitudinal direction of the cylinder 12 so as to extend in the circumferential direction. However, the self-discharge type charge eliminator is not fixed to the surface of the bottom end portion of the cylinder 12.

Also in FIG. 9, the piston 14 is illustrated at the position when the vehicle is in the standard load state, namely at the standard position. The self-discharge type charge eliminator 90A according to this embodiment is fixed to the surface of the cylinder 12 within a predetermined range 88 corresponding to a range in the direction along the axis 12, in which the main body part 14M exists when the piston 14 is at the standard position.

As illustrated in FIG. 8, the self-discharge type charge eliminator 90C in the strip shape is fixed by bonding to a cylindrical outer surface of the spring seat cushion 60A so as to extend in the circumferential direction. As in the first embodiment, the self-discharge type charge eliminator 90E in the strip shape is fixed by bonding to the top surface of the outer tubular member 18C of the upper support 18 configured to support the top end of the rod part 14R of the piston 14.

In terms of the general charge state of the vehicle, among portions at which the spring seat cushion 60A and the outer tubular member 18C abut against each other, a portion closest to a center of the metal foil of the charge eliminator 90C falls within a range in the surface direction in which the effect of the diselectrification by the charge eliminator 90C is exerted. Further, the cylinder 12 falls within a range in the thickness direction in which the effect of the diselectrification by the charge eliminator 90A is exerted. The outer tubular member 18C of the upper support 18 falls within a range in the thickness direction in which the effect of the diselectrification by the charge eliminators 90E is exerted.

Thus, the positive electric charge that is charged to the spring seat cushion 60A of the dust boot 60 is reduced through the diselectrification by the charge eliminator 90C, and the electric potential of the spring seat cushion 60A is thus reduced. Thus, the positive electric charge that is charged to the piston 14 moves to the dust boot 60 via the outer tubular member 18C to be reduced, and the electric potential of the piston 14 is thus reduced. The electric potential of the piston 14 is reduced also through the diselectrification by the charge eliminator 90E, which reduces the electric potential of the outer tubular member 18C of the upper support 18. Further, the positive electric charge that is charged to the cylinder 12 is reduced through the diselectrification by the charge eliminator 90A, resulting in reduction in the electric potential of the cylinder 12.

Thus, according to the second embodiment, as in the first embodiment, the positive electric charge that is charged to the oil 76 in contact with the cylinder 12 and the piston 14 can be moved to the cylinder 12 and the piston 14, thereby being capable of reducing the charge amount of the electric charge to the oil 76. Thus, the positive electric charge can be prevented from being excessively charged to the oil 76, thereby being capable of preventing such a state that the viscosity of the oil 76 is excessively increased by the excessive charging of the electric charge to generate an excessively large damping force of the shock absorber 16.

In particular, according to the second embodiment, the self-discharge type charge eliminator 90A is fixed to the surface of the cylinder 12 within the predetermined range 88. Thus, the electric charge to the cylinder 12 within the predetermined range 88 can efficiently be reduced, thereby being capable of efficiently reducing the charge amount of the oil 76 around a region in which the main body part 14M exists when the piston 14 is at the standard position. Note that, according to the second embodiment, the charge eliminator 90A is fixed to the surface of the cylinder 12 within the predetermined range 88, but the charge eliminator 90A may partially or entirely be positioned outside the predetermined range 88. Also in this case, the charge amount of the oil 76 in the cylinder 12 can be reduced by reducing the electric charge to the cylinder 12.

As in the first embodiment, the following effect was able to be verified through an experiment conducted on an actual vehicle by the inventors of the present invention. That is, when the self-discharge type charge eliminators 90A, 90C, and 90E were not provided, the electric potential of the oil 76 in the cylinder 12 was increased to about several hundreds of volts to about one thousand volts. In contrast, according to the configuration of the second embodiment, the electric potential of the oil 76 was increased only to about several tens of volts, and appropriate viscosity of the oil 76 was thus able to be secured.

Third Embodiment

Figure 10:
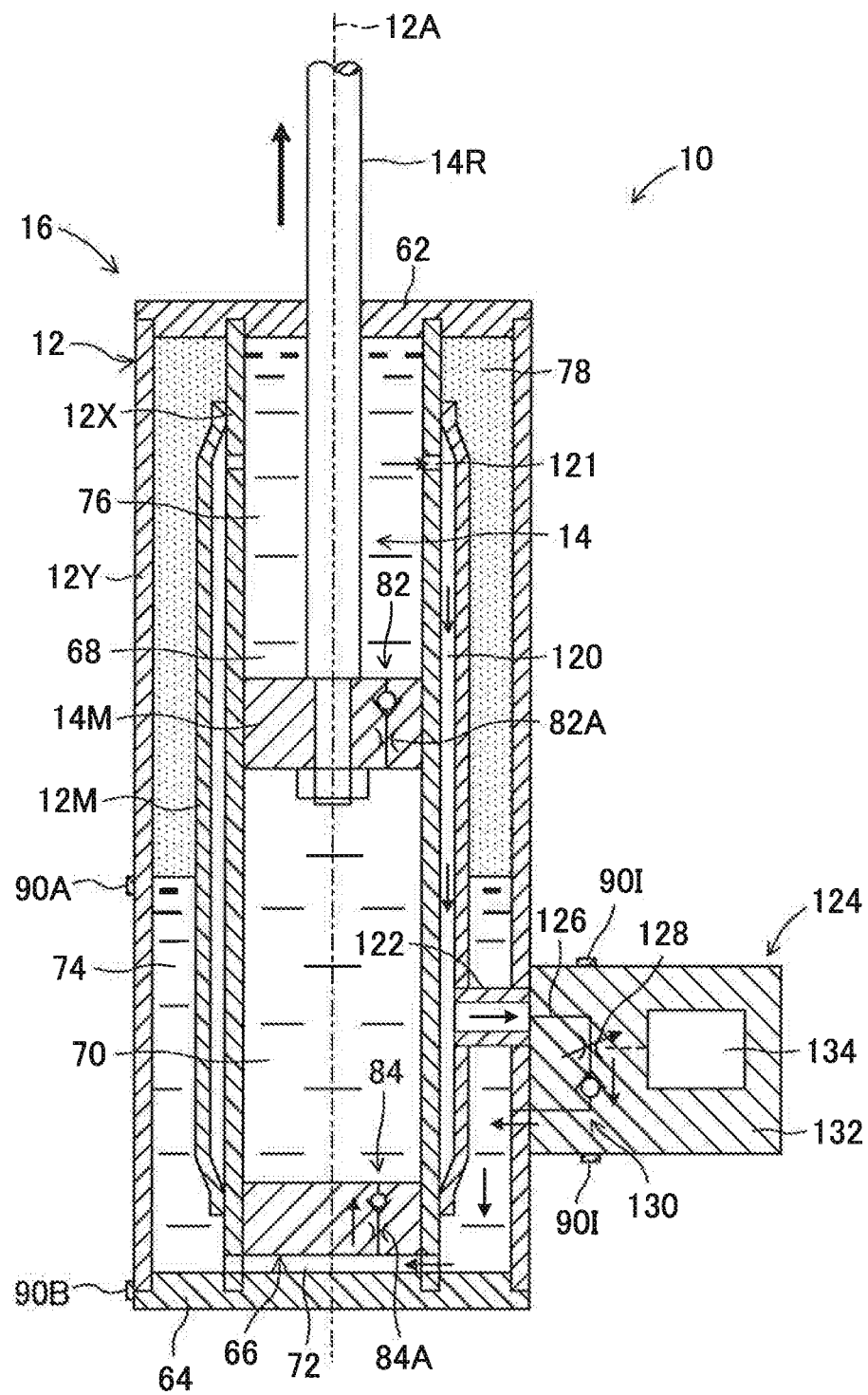
FIG. 10 is an enlarged cross sectional view for illustrating an overview of a shock absorber in an expansion stroke in a damping force generation device according to a third embodiment of the present invention constructed as a twin-tube variable damping force shock absorber.
Figure 11:
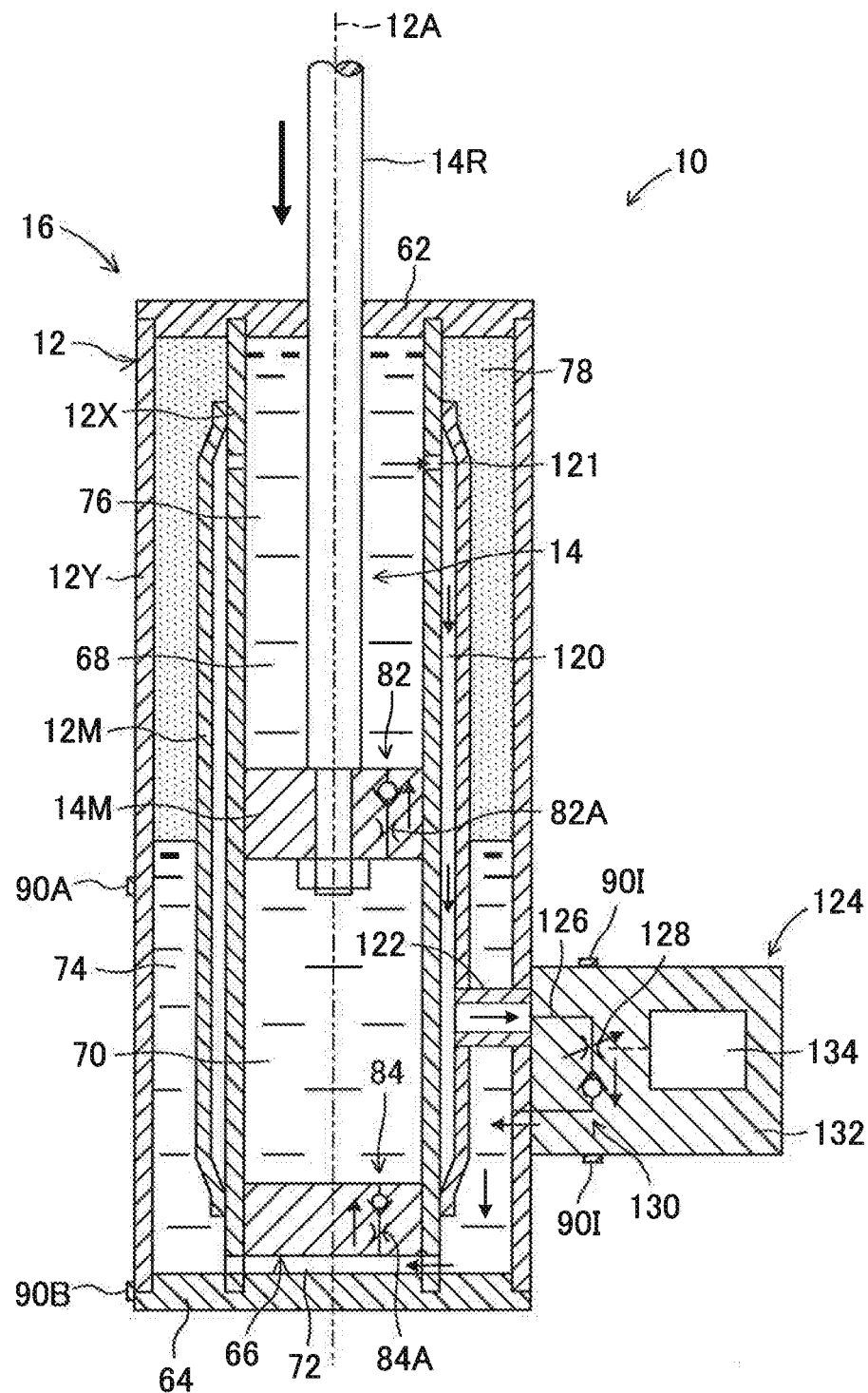
FIG. 11 is an enlarged cross sectional view for illustrating an overview of the shock absorber in a contraction stroke in the damping force generation device according to the third embodiment.

FIG. 10 and FIG. 11 are enlarged cross sectional views for illustrating an overview of a shock absorber 16 in a damping force generation device 10 according to a third embodiment of the present invention constructed as a twin-tube variable damping force shock absorber. In particular, FIG. 10 is a view for illustrating the expansion stroke, and FIG. 11 is a view for illustrating the contraction stroke. The shock absorber 16 according to the third embodiment is constructed as a so-called uniflow type variable damping force shock absorber.

As illustrated in FIG. 10 and FIG. 11, between the inner cylinder 12X and the outer cylinder 12Y, a metal intermediate cylinder 12M extending along the axis 12A coaxially with the inner cylinder 12X and the outer cylinder 12Y is arranged. The intermediate cylinder 12M is radially separated from the inner cylinder 12X and the outer cylinder 12Y, and is fixed to the inner cylinder 12X by welding or the like at a top end and a bottom end, to thereby form an annular space 120 between the intermediate cylinder 12M and the inner cylinder 12X. A top end portion of the annular space 120 is connected to the upper cylinder chamber 68 through a communication hole 121 formed in the inner cylinder 12X.

A metal conduit 122 extending perpendicularly to the axis 12A is fixed by welding or the like to the intermediate cylinder 12M and the outer cylinder 12Y. The conduit 122 communicates with the annular space 120 at one end, and is connected to one end of an internal passage 126 formed inside an effective passage cross sectional area changing device 124 at another end. The internal passage 126 communicates with the annular chamber 74 at another end, and has a variable orifice 128 between the one end and the another end.

Thus, the annular space 120, the conduit 122, and the internal passage 126 form a bypass passage 130 connecting the upper cylinder chamber 68 in which the rod part 14R of the piston 14 exists and the annular chamber 74 serving as a reservoir chamber, and having the variable orifice 128 in the course of the bypass passage 130. As indicated by the arrows in FIG. 10 and FIG. 11, the bypass passage 130 allows only a flow of the oil 76 from the annular space 120 toward the annular chamber 74.

A housing 132 of the effective passage cross sectional area changing device 124 is made of a metal, and is formed into a substantially columnar shape extending perpendicularly to the axis 12A. The housing 132 is fixed to the outer cylinder 12Y by welding or the like. In the housing 132, an electromagnetic actuator 134 is accommodated. The electromagnetic actuator 134 is controlled by an electronic control device (not shown) and drives a valve element (not shown) of the variable orifice 128, to thereby change an effective passage cross sectional area of the variable orifice 128. The effective passage cross sectional area changing device 124 is configured such that the electric charge can move from the oil 76 serving as the working liquid passing through the bypass passage 130 to the housing 132.

Note that, the effective passage cross sectional area changing device 124 may have an arbitrary structure as long as the effective passage cross sectional area changing device 124 has the variable orifice 128 formed in the course of the bypass passage 130 and an effective passage cross sectional area of the variable orifice 128 can be changed by control. As a specific example of the effective passage cross sectional area changing device 124, refer to, for example, Japanese Patent Application Laid-open No. 2007-225111, Japanese Patent Application Laid-open No. Hei 11-30265, and Japanese Patent Application Laid-open No. Hei 6-33969 if necessary.

As understood from comparison between each of FIG. 10 and FIG. 11 and FIG. 4, according to this embodiment, on the main body part 14M of the piston 14, the damping force generation valve 82 for a contraction stroke is provided, but the damping force generation valve 80 for an expansion stroke is not provided. Conversely, on the base valve assembly 66, the damping force generation valve 84 for an expansion stroke is provided, but the damping force generation valve 86 for a contraction stroke is not provided.

Thus, in the expansion stroke of the shock absorber 16, as indicated by the arrows of FIG. 10, the oil 76 in the upper cylinder chamber 68 moves to the annular chamber 74 through the bypass passage 130. Further, the oil 76 moves to the lower cylinder chamber 70 through the base valve chamber 72 and the damping force generation valve 84 for an expansion stroke of the base valve assembly 66. Thus, a flow resistance at the time of the passage of the oil 76 through the variable orifice 128 formed in the bypass passage 130, and a flow resistance at the time of the passage of the oil 76 through the damping force generation valve 84 generate the damping force in the expansion stroke.

In contrast, in the contraction stroke of the shock absorber 16, as indicated by the arrows of FIG. 11, the oil 76 in the lower cylinder chamber 70 moves to the upper cylinder chamber 68 through the damping force generation valve 82. A volume of the rod part 14R of the piston 14 existing in the inner cylinder 12X is increased, and the oil 76 corresponding to the volume thus moves from the upper cylinder chamber 68 to the annular chamber 74 through the bypass passage 130. Thus, a flow resistance at the time of the passage of the oil 76 through the damping force generation valve 82, and a flow resistance at the time of the passage of the oil 76 through the variable orifice 128 formed in the bypass passage 130 generate the damping force in the contraction stroke.

As understood from the above description, in any of the expansion stroke and the contraction stroke of the shock absorber 16, the oil 76 moves in one direction from the upper cylinder chamber 68 to the annular chamber 74 through the bypass passage 130. Thus, the variable orifice 108 functions as the damping force generation valve common to the expansion stroke and the contraction stroke. The effective passage cross sectional area of the variable orifice 128 is controlled by the electromagnetic actuator 134, to thereby change the damping forces in the expansion stroke and the contraction stroke.

As in the above-mentioned first and second embodiments, the self-discharge type charge eliminators 90A and 90B each in the strip shape are fixed by bonding to the surfaces of the center portion and the bottom end portion in the longitudinal direction of the outer cylinder 12Y of the cylinder 12 so as to extend in the circumferential direction. A self-discharge type charge eliminator 90I in the strip shape is fixed by bonding to a surface of the housing 132 of the effective passage cross sectional area changing device 124 so as to extend in the circumferential direction. Although the illustration is omitted in FIG. 10 and FIG. 11, as in the above-mentioned first embodiment, the self-discharge type charge eliminators each in the strip shape are fixed by bonding to the top surface of the outer tubular member of the upper support configured to support the top end of the rod part 14R of the piston 14 and the like.

According to the third embodiment, as in the above-mentioned first embodiment, the inner cylinder 12X, the outer cylinder 12Y, and the piston 14 can be diselectrified by the self-discharge type charge eliminator 90A and the like. Thus, the positive electric charge that is charged to the oil 76 in the shock absorber 16 can be moved to the outer cylinder 12Y, the piston 14, and the like, thereby being capable of reducing the charge amount of the electric charge to the oil 76 in the shock absorber 16.

In particular, according to the third embodiment, the housing 132 of the effective passage cross sectional area changing device 124 is diselectrified by the self-discharge type charge eliminator 90I, and the oil 76 moves from the upper cylinder chamber 68 to the annular chamber 74 through the bypass passage 130 in any of the expansion stroke and the contraction stroke. Thus, the positive electric charge that is charged to the oil 76 flowing through the bypass passage 130 can be moved to the housing 132 of the effective passage cross sectional area changing device 124, thereby being capable of reducing the charge amount of the electric charge to the oil 76 circulating through the bypass passage 130. Thus, compared to a case where the self-discharge type charge eliminator 90I is not fixed to the surface of the housing 132, the damping force of the shock absorber 16 can be effectively prevented from being excessively increased by the electric charge that is charged to the oil 76.

Fourth Embodiment

Figure 12:
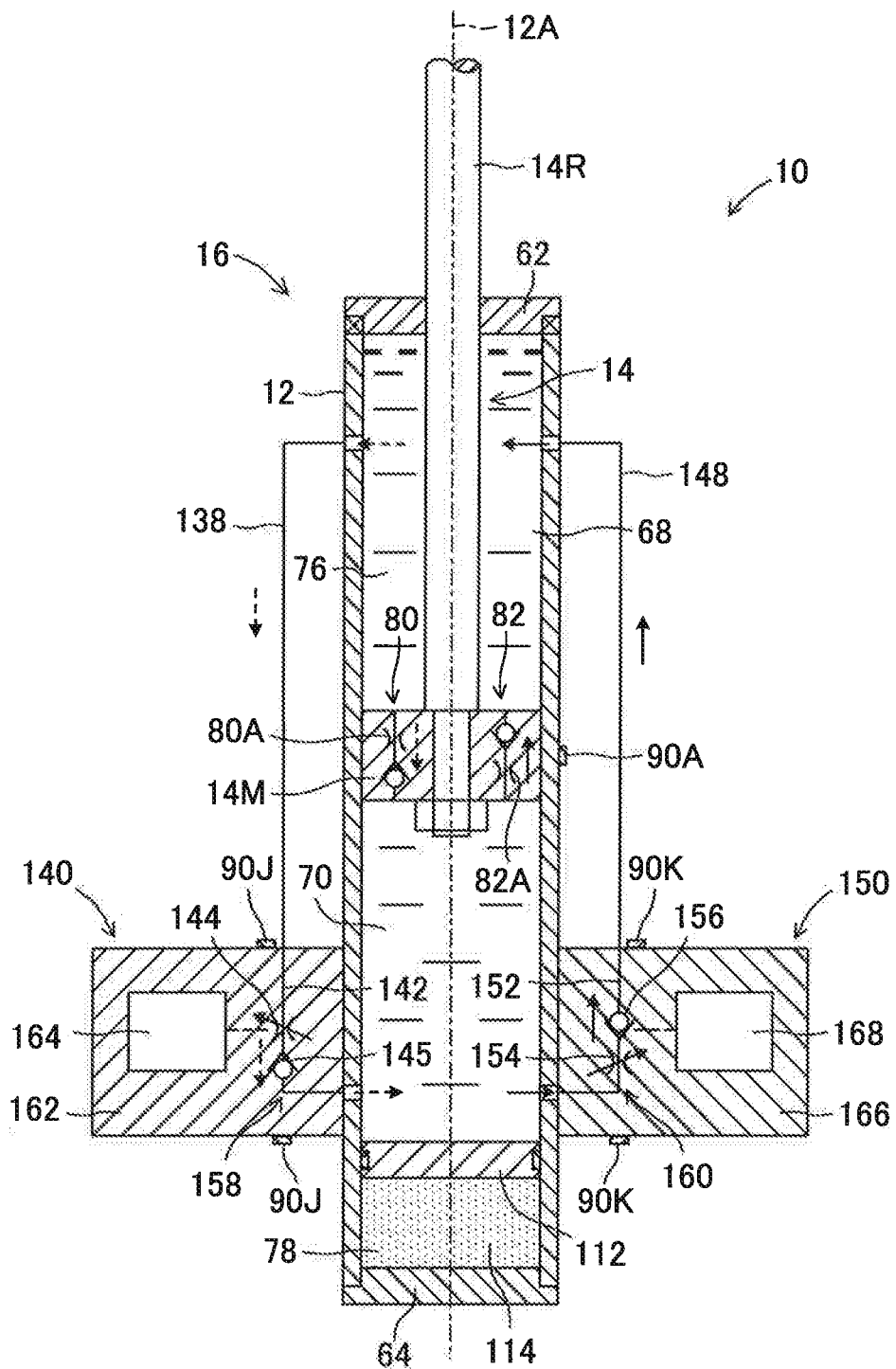
FIG. 12 is an enlarged cross sectional view for illustrating an overview of a shock absorber in a damping force generation device according to a fourth embodiment of the present invention constructed as a mono-tube variable damping force shock absorber.

FIG. 12 is an enlarged cross sectional view for illustrating an overview of a shock absorber 16 in a damping force generation device 10 according to a fourth embodiment of the present invention constructed as a mono-tube variable damping force shock absorber.

As understood from comparison between FIG. 12 and each of FIG. 9 to FIG. 11, the shock absorber 16 according to the fourth embodiment is constructed as the mono-tube variable damping force shock absorber. One end of a first conduit 138 is connected to the upper cylinder chamber 68. Another end of the first conduit 138 is connected to one end of an internal passage 142 formed in a first effective passage cross sectional area changing device 140. Another end of the internal passage 142 is connected to the lower cylinder chamber 70. Between the one end and the another end of the internal passage 142, a first variable orifice 144 and a first check valve 146 are provided. The check valve 146 allows the oil 76 to move from the upper cylinder chamber 68 to the lower cylinder chamber 70, but inhibits the oil 76 from moving from the lower cylinder chamber 70 to the upper cylinder chamber 68.

Similarly, one end of a second conduit 148 is connected to the upper cylinder chamber 68. Another end of the second conduit 148 is connected to one end of an internal passage 152 formed in a second effective passage cross sectional area changing device 150. Another end of the internal passage 152 is connected to the lower cylinder chamber 70. Between the one end and the another end of the internal passage 152, a second variable orifice 154 and a second check valve 156 are provided. The check valve 156 allows the oil 76 to move from the lower cylinder chamber 70 to the upper cylinder chamber 68 through the internal passage 152, but inhibits the oil 76 from moving from the upper cylinder chamber 68 to the lower cylinder chamber 70 through the internal passage 152.

The first conduit 138 and the internal passage 142 form a first bypass passage 158 connecting the upper cylinder chamber 68 and the lower cylinder chamber 70, and having the first variable orifice 144 and the first check valve 146 in the course of the first bypass passage 158. Similarly, the second conduit 148 and the internal passage 152 form a second bypass passage 160 connecting the upper cylinder chamber 68 and the lower cylinder chamber 70, and having the second variable orifice 154 and the second check valve 156 in the course of the second bypass passage 160.

A housing 162 of the first effective passage cross sectional area changing device 140 is made of a metal, and is formed into a substantially columnar shape extending perpendicularly to the axis 12A. The housing 1642 is fixed to the cylinder 12 by welding or the like. In the housing 162, an electromagnetic actuator 164 is accommodated. The electromagnetic actuator 164 is controlled by an electronic control device (not shown) and drives a valve element (not shown) of the first variable orifice 144, to thereby change an effective passage cross sectional area of the first variable orifice 144. The first effective passage cross sectional area changing device 1420 is configured such that the electric charge can move from the oil 76 passing through the first bypass passage 158 to the housing 162.

Similarly, a housing 166 of the second effective passage cross sectional area changing device 150 is made of a metal, and is formed into a substantially columnar shape extending perpendicularly to the axis 12A. The housing 166 is fixed to the cylinder 12 by welding or the like. In the housing 166, an electromagnetic actuator 168 is accommodated. The electromagnetic actuator 168 is controlled by an electronic control device (not shown) and drives a valve element (not shown) of the second variable orifice 154, to thereby change an effective passage cross sectional area of the second variable orifice 154. The second effective passage cross sectional area changing device 150 is configured such that the electric charge can move from the oil 76 passing through the second bypass passage 160 to the housing 166.

In the expansion stroke of the shock absorber 16, as indicated by the broken arrows of FIG. 12, the oil 76 in the upper cylinder chamber 68 moves to the lower cylinder chamber 70 through the damping force generation valve 80 for an expansion stroke, which is provided in the main body part 14M of the piston 14. Further, the oil 76 in the upper cylinder chamber 68 moves to the lower cylinder chamber 70 through the first bypass passage 158. Thus, a flow resistance at the time of the passage of the oil 76 through the damping force generation valve 80, and a flow resistance at the time of the passage of the oil 76 through the first variable orifice 144 formed in the first bypass passage 158 generate the damping force in the expansion stroke. The damping force in the expansion stroke is changed by the electromagnetic actuator 164 that controls the effective passage cross sectional area of the first variable orifice 144.

In particular, in such a state that the effective passage cross sectional area of the first variable orifice 144 is less than the effective passage cross sectional area of the damping force generation valve 80, the oil 76 first passes through the damping force generation valve 80. However, in such a state that the effective passage cross sectional area of the first variable orifice 144 is more than the effective passage cross sectional area of the damping force generation valve 80, the oil 76 first passes through the first variable orifice 144.

In contrast, in the contraction stroke of the shock absorber 16, as indicated by the solid arrows of FIG. 12, the oil 76 in the lower cylinder chamber 70 moves to the upper cylinder chamber 68 through the damping force generation valve 82 for a contraction stroke, which is provided in the main body part 14M of the piston 14. Further, the oil 76 in the lower cylinder chamber 70 moves to the upper cylinder chamber 68 through the second bypass passage 160. Thus, a flow resistance at the time of the passage of the oil 76 through the damping force generation valve 82, and a flow resistance at the time of the passage of the oil 76 through the second variable orifice 154 formed in the second bypass passage 160 generate the damping force in the contraction stroke. The damping force in the contraction stroke is changed by the electromagnetic actuator 168 that controls the effective passage cross sectional area of the second variable orifice 154.

As in the expansion stroke, in such a state that the effective passage cross sectional area of the second variable orifice 154 is less than the effective passage cross sectional area of the damping force generation valve 82, the oil 76 first passes through the damping force generation valve 82. However, in such a state that the effective passage cross sectional area of the second variable orifice 154 is more than the effective passage cross sectional area of the damping force generation valve 82, the oil 76 first passes through the second variable orifice 154.

As in the above-mentioned other embodiments, the self-discharge type charge eliminator 90A in the strip shape is fixed by bonding to the surface of the center portion in the longitudinal direction of the outer cylinder 12Y of the cylinder 12 so as to extend in the circumferential direction. Self-discharge type charge eliminators 90J and 90K each in the strip shape are fixed by bonding to surfaces of the housings 162 and 166 of the first and second effective passage cross sectional area changing devices 140 and 150 so as to extend in the circumferential direction. Although the illustration is omitted in FIG. 12, as in the above-mentioned other embodiments, the self-discharge type charge eliminators each in the strip shape are fixed by bonding to the top surface of the outer tubular member of the upper support configured to support the top end of the rod part 14R of the piston 14 and the like.

According to the fourth embodiment, as in the above-mentioned second embodiment, the cylinder 12 and the piston 14 can be dielectrified by the self-discharge type charge eliminator 90A and the like. Thus, the positive electric charge that is charged to the oil 76 in the upper cylinder chamber 68 and the lower cylinder chamber 70 can be moved to the cylinder 12, the piston 14, and the like, thereby being capable of reducing the charge amount of the electric charge to the oil 76 in the upper cylinder chamber 68 and the lower cylinder chamber 70.

In particular, according to the fourth embodiment, the housing 162 of the first effective passage cross sectional area changing device 140 is dielectrified by the self-discharge type charge eliminator 90J, and the housing 166 of the second effective passage cross sectional area changing device 150 is dielectrified by the self-discharge type charge eliminator 90K. Thus, the positive electric charge that is charged to the oil 76 flowing through the first and second bypass passages 158 and 160 can be moved respectively to the housing 162 and 166, thereby being capable of reducing the charge amount of the electric charge to the oil 76. Thus, compared to a case where the self-discharge type charge eliminators 90J and 90K are not fixed respectively to the surfaces of the housings 162 and 166, the damping force of the shock absorber 16 can be effectively prevented from being excessively increased by the electric charge that is charged to the oil 76.

As understood from the description given above, the charge eliminator 90A and the like according to the above-mentioned respective embodiments are so-called ion-separation non-grounded self-discharge type charge eliminators. In other words, the charge eliminator 90A and the like separate the air into positive air ions and negative air ions through corona discharge, and carry out the diselectrification through electrical neutralization between the positive electric charge that is charged to the components of the damping force generation device 10 and the negative air ions, thereby requiring no wires for electrical grounding. Thus, compared to the case where the electrostatic eliminator disclosed in Japanese Patent Application Laid-open No. 2009-181694 is used, the structure for the diselectrification in the damping force generation device 10 can be simplified, and a cost required for attaining the diselectrification can be greatly reduced.

In particular, according to the above-mentioned respective embodiments, the charge amount of the electric charge to the cylinder 12 can be reduced by the charge eliminator 90A and the like, and the charge amount of the electric charge to the piston 14 can be reduced by the charge eliminator 90C and the like. Thus, compared to a case where the charge amount of the electric charge is reduced only for one of the cylinder 12 and the piston 14, the charge amount of the electric charge to the oil 76 can be effectively reduced. As a result, the damping force of the shock absorber 16 can be effectively prevented from being excessively increased.

Moreover, according to the first embodiment, the charge eliminators 90C and 90D are fixed respectively to the outer peripheral portion of the resin spring seat cushion 58 and the outer peripheral portion of the mounting part 60A of the resin dust boot 60. Similarly, according to the second embodiment, the charge eliminator 90C is fixed to the outer peripheral portion of the spring seat cushion 60A of the resin dust boot 60. The amount of the electric charge that is charged to the resin members is more than the amount of the electric charge that is charged to the metal members, and hence, compared to the case where the charge eliminators are fixed to the metal members, the diselectrification for the members can be effectively carried out. Thus, through the diselectrification for the resin members and the movement of the electric charge that is charged to the piston 14 to the resin members via the rod part 14R, the charge amount of the electric charge to the piston 14 can efficiently be reduced.

Moreover, according to the first and second embodiments, even if the self-discharge type charge eliminator is installed on at least one of the resin spring cushion 58 or the resin dust boot 60, the charge eliminator is directly fixed by bonding to those members. Thus, a special member need not be added in order to fix the charge eliminator, and hence the charge amount of the electric charge to the oil 76 in the shock absorber 16 can be reduced without causing increase in complexity of the structure and cost of the damping force generation device 10. Note that, even if at least one of the spring seat cushion 58 or the dust boot 60 is made of rubber, it has been confirmed that the charge amount of the electric charge to the oil 76 can be reduced by fixing the self-discharge type charge eliminator in the same way as in the first and second embodiments.

Moreover, according to the third and fourth embodiments, in the variable damping force shock absorber 16, for example, the self-discharge type charge eliminator 90I is provided on the surface of the effective passage cross sectional area changing device 124 configured to change the effective passage cross sectional area such as that of the variable orifice 128 formed in the bypass passage 130. Thus, it is possible to effectively prevent such a state that the viscosity of the working liquid passing through the variable orifice 128 and the like is increased by the excessive charging of the electric charge to generate the excessive damping force.

Further, according to the above-mentioned respective embodiments, each of the charge eliminator 90A and the like is in the form of the tape obtained by applying the conductive pressure-sensitive adhesive 94 to the conductive metal foil 92, and the charge eliminator is fixed to the member to be diselectrified by the bonding of the metal foil 92 to the member with the adhesive 94. Thus, the metal foil for the diselectrification can easily be fixed by the bonding to the surface of the member to be diselectrified. Further, a layer of the adhesive has the conductivity, and hence, compared to the case where the layer of the adhesive does not have the conductivity, the electric charge can efficiently be moved from the specific member to the metal foil, thereby being capable of enhancing the effect of the diselectrification. Note that, as long as the thickness of the layer of the adhesive is about several tens of micrometers to about several hundreds of micrometers, even if the layer of the adhesive does not have the conductivity, the electric charge can be moved from the specific member to the metal foil. Thus, the layer of the adhesive need not have the conductivity.

The specific embodiments of the present invention are described in detail above. However, the present invention is not limited to the above-mentioned embodiments. It is apparent for those skilled in the art that various other embodiments may be employed within the scope of the present invention.

For example, in the above-mentioned respective embodiments, the self-discharge type charge eliminator 90A and the like are fixed to the members constructing the shock absorber 16 and the auxiliary members connected to the shock absorber, but any one of the charge eliminators may be omitted.

Similarly, according to the above-mentioned second embodiment, the self-discharge type charge eliminators 90A, 90C, and 90E are fixed to the members constructing the shock absorber 16 and the auxiliary members connected to the shock absorber, but any one of the charge eliminators 90A, 90C, and 90E may be omitted.

Moreover, the charge eliminators 90A and the like according to the above-mentioned respective embodiments are fixed at the specific positions such as a position on the rear side of the vehicle with respect to the axis 12A of the shock absorber 16. However, the position about the axis 12A to which the charge eliminator is fixed need not be the position according to the above-mentioned embodiments.

Figure 13:
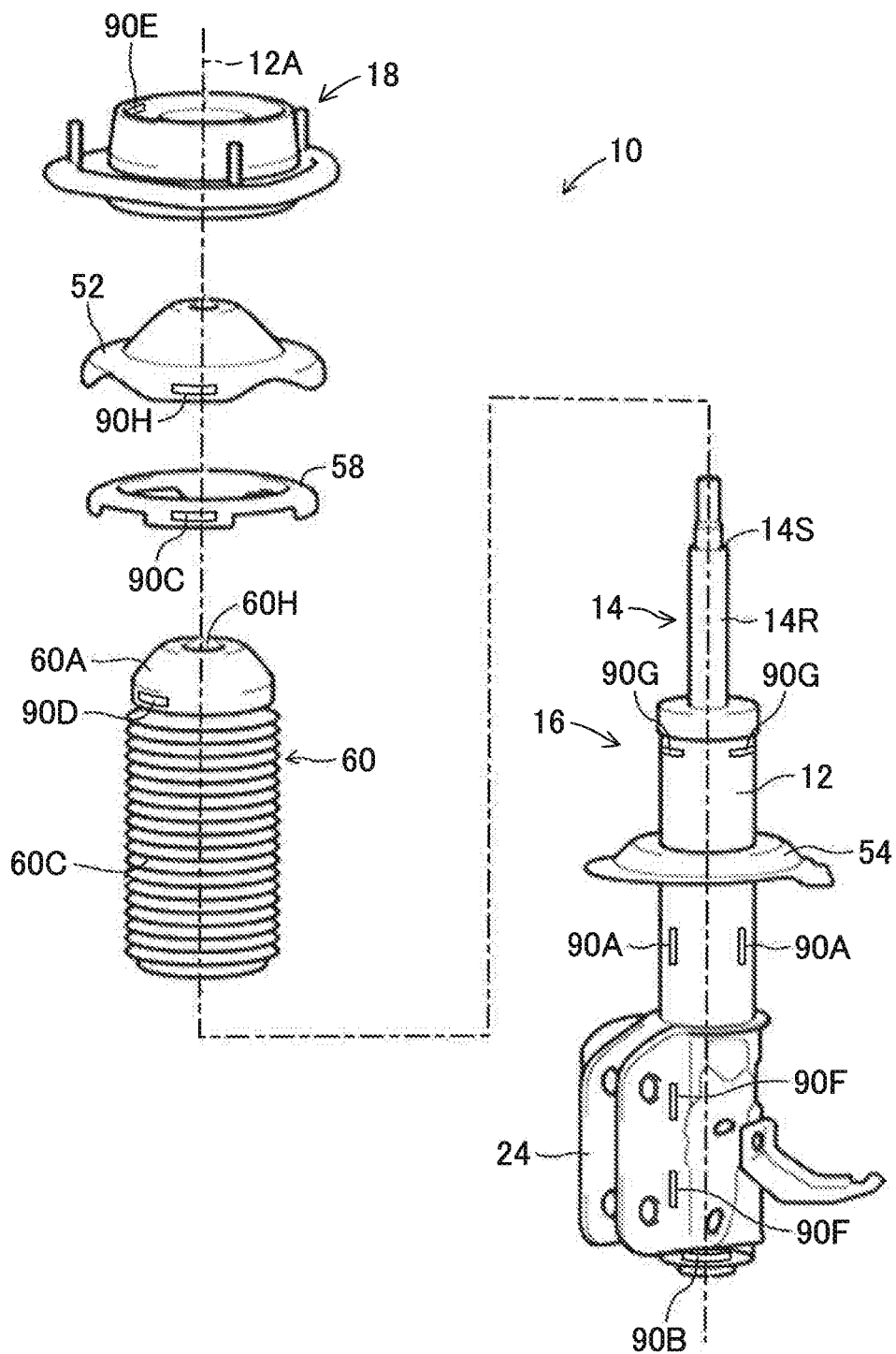
FIG. 13 is an exploded perspective view of a damping force generation device according to a modified example.

Moreover, the number of the charge eliminators to be fixed and the extension directions of the charge eliminators are not limited to the number and the extension directions of each of the above-mentioned embodiments. For example, as illustrated in FIG. 13 as a modified example, a plurality of charge eliminators 90A may be fixed to the cylinder 12 below the lower spring seat 54, and the charge eliminators 90A may be fixed so as to extend along the axis 12A. Further, as in the first embodiment, when the bracket 24 is fixed to the bottom end portion of the cylinder 12, self-discharge type charge eliminators 90F may be fixed to the bracket 24.

In particular, as in the first and third embodiments, when the shock absorber 16 is the twin-tube shock absorber, self-discharge type charge eliminators 90G may be fixed to the surface of the outer cylinder 12Y or the surface of the end cap 62 close to the top end of the cylinder 12. In this case, the top end of the outer cylinder 12Y or the end cap 62 can be diselectrified more efficiently than in the first embodiment, thereby being capable of efficiently reducing the charge amount of the electric charge to the inner cylinder 12X and the oil 76 inside the inner cylinder 12X. Further, a self-discharge type charge eliminator 90H may be fixed to an outer peripheral portion of the upper spring seat 52.

Moreover, the shock absorber 16 according to the first embodiment is the twin-tube shock absorber, but the shock absorber 16 may be a mono-tube shock absorber. Similarly, the shock absorber 16 according to the second embodiment is the mono-tube shock absorber, but the shock absorber 16 may be a twin-tube shock absorber.

Moreover, according to the above-mentioned fourth embodiment, the effective passage cross sectional areas of the first variable orifice 124 and the second variable orifice 134 are controlled by the corresponding electromagnetic actuators 144 and 148. However, for example, there may be employed such a modification that the first variable orifice 124 and the second variable orifice 134 are formed by a single spool valve, and the spool valve is driven by a single electromagnetic actuator. In this case, the number of the effective passage cross sectional area changing devices only needs to be one. The number of components can thus be reduced, and the number of self-discharge type charge eliminators can also be reduced compared to the above-mentioned fourth embodiment.

Moreover, according to the above-mentioned embodiments, the suspension is the MacPherson strut suspension. However, the suspension to which the damping force generation device according to the present invention is applied may be other arbitrary types of suspension such as a double wishbone suspension, a trailing arm suspension, and an axle suspension.

What is claimed is:

1. A damping force generation device for a vehicle, comprising:
    a shock absorber comprising:
        a cylinder; and
        a piston fitted into the cylinder in a reciprocally movable manner to form two cylinder chambers in cooperation with the cylinder,
        the shock absorber being coupleable to one of a sprung member and an unsprung member of the vehicle at a rod part of the piston, and to another one of the sprung member and the unsprung member at the cylinder,
        the shock absorber being configured to generate a damping force due to a flow resistance when a working liquid passes through an orifice formed in a main body part of the piston to move between the two cylinder chambers along with relative displacement between the sprung member and the unsprung member; and
    a self-discharge type charge eliminator provided on a surface of a specific member comprising at least one of a member constructing the shock absorber or an auxiliary member connected to the shock absorber,
    the self-discharge type charge eliminator comprising an air-ion conversion self-discharge type charge eliminator configured to reduce a charge amount of positive electric charge, which is charged to the specific member, through diselectrification carried out by changing air around the air-ion conversion self-discharge type charge eliminator into negative air ions depending on the charge amount of the specific member, and by causing the negative air ions to be attracted to the positive electric charge of the specific member to neutralize the positive electric charge, to thereby reduce a charge amount of the working liquid.

2. A damping force generation device for a vehicle according to claim 1, wherein:
    the specific member is a dust boot made of a resin as the auxiliary member connected to the rod part;
    the self-discharge type charge eliminator is provided on a surface of the dust boot; and
    the rod part and the dust boot are connected to each other so that the positive electric charge is movable from the rod part to the dust boot.

3. A damping force generation device for a vehicle according to claim 1, wherein:
    the shock absorber is a twin-tube shock absorber comprising:
        an inner cylinder to which the piston is fitted; and
        an outer cylinder surrounding the inner cylinder;
    the specific member is the outer cylinder; and
    the self-discharge type charge eliminator is provided on a surface of the outer cylinder below a liquid level of the working liquid between the inner cylinder and the outer cylinder when the vehicle is in a standard load state.

4. A damping force generation device for a vehicle according to claim 1, wherein:
    the shock absorber is a twin-tube shock absorber comprising:
        an inner cylinder to which the piston is fitted;
        an outer cylinder surrounding the inner cylinder to form a reservoir chamber between the inner cylinder and the outer cylinder;
        a base valve assembly; and
        an end cap closing end portions of the inner cylinder and the outer cylinder to define a base valve chamber communicating with the reservoir chamber in cooperation with the base valve assembly;
    the specific member is at least one of the outer cylinder or the end cap; and
    the positive electric charge is movable from the inner cylinder to the specific member.

5. A damping force generation device for a vehicle according to claim 1, wherein:
    the shock absorber is a mono-tube shock absorber;
    the specific member is the cylinder; and
    the self-discharge type charge eliminator is provided on a surface of the cylinder so that at least a part of the self-discharge type charge eliminator is positioned within a predetermined range corresponding to a range in a direction of the relative displacement, in which the main body part of the piston exists when the vehicle is in a standard load state.

6. A damping force generation device for a vehicle according to claim 1, wherein:
    the shock absorber is a variable damping force shock absorber comprising:
        a bypass passage for bypassing the main body part of the piston to connect the two cylinder chambers to each other;
        a variable orifice formed in the bypass passage; and
        an effective passage cross sectional area changing device configured to change an effective passage cross sectional area of the variable orifice,
        the variable damping force shock absorber being configured such that, when the piston is displaced with respect to the cylinder, at least a part of the working liquid in one of the two cylinder chambers moves to another one of the two cylinder chambers through the bypass passage;
    the specific member is the effective passage cross sectional area changing device; and
    the positive electric charge is movable from the working liquid passing through the bypass passage to the effective passage cross sectional area changing device.

7. A damping force generation device for a vehicle according to claim 1, wherein:
 the self-discharge type charge eliminator comprises:
  a conductive metal foil having a large number of minute protrusions and recesses formed on a side surface on an outer periphery of the conductive metal foil; and
  a layer of an adhesive applied to one surface of the conductive metal foil; and
 the self-discharge type charge eliminator is fixed to the specific member by bonding with the layer of the adhesive.

* * * * *